(12) United States Patent
Watanabe et al.

(10) Patent No.: US 6,198,718 B1
(45) Date of Patent: Mar. 6, 2001

(54) DISC CARTRIDGE

(75) Inventors: Toshio Watanabe; Hidenori Mori, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/078,235

(22) Filed: May 13, 1998

(30) Foreign Application Priority Data

May 19, 1997 (JP) .................................................... 9-127728

(51) Int. Cl.[7] .................................................. G11B 23/03
(52) U.S. Cl. ............................................................ 369/291
(58) Field of Search ................................ 369/291, 77.2; 360/133, 97.02, 137

(56) References Cited

U.S. PATENT DOCUMENTS

| | | | |
|---|---|---|---|
| 5,018,039 | * | 5/1991 | Shiba et al. ............................ 360/133 |
| 5,319,630 | * | 6/1994 | Earman et al. ........................ 369/291 |
| 5,326,608 | * | 7/1994 | Ikebe et al. ........................... 428/64.1 |
| 5,327,314 | * | 7/1994 | Kikuchi et al. ........................ 360/133 |
| 5,691,860 | * | 11/1997 | Hoppe .................................. 360/97.02 |
| 5,835,318 | * | 11/1998 | Kikuchi ................................. 360/133 |

FOREIGN PATENT DOCUMENTS 60-251576 * 12/1985 (JP) .

* cited by examiner

*Primary Examiner*—David L. Ometz
*Assistant Examiner*—Angel Castro
(74) *Attorney, Agent, or Firm*—Frommer, Lawrence & Haug, LLP.; William S. Frommer; Matthew K. Ryan

(57) ABSTRACT

A disc cartridge which is capable of effectively preventing undesirable and deteriorating recording and playback characteristics of an optical disc accommodated and retained therein due to the effects of dust particles and other foreign materials being adhered to the surfaces of the optical disc. In accordance therewith, shock relieving or sealing members close a gap between the shutter and the case of the disc cartridge to prevent dust particles and other foreign materials from intruding onto the surfaces of the optical disc. In addition, sheet-like members are provided in this disc cartridge for cleaning the surfaces of the optical disc.

3 Claims, 21 Drawing Sheets

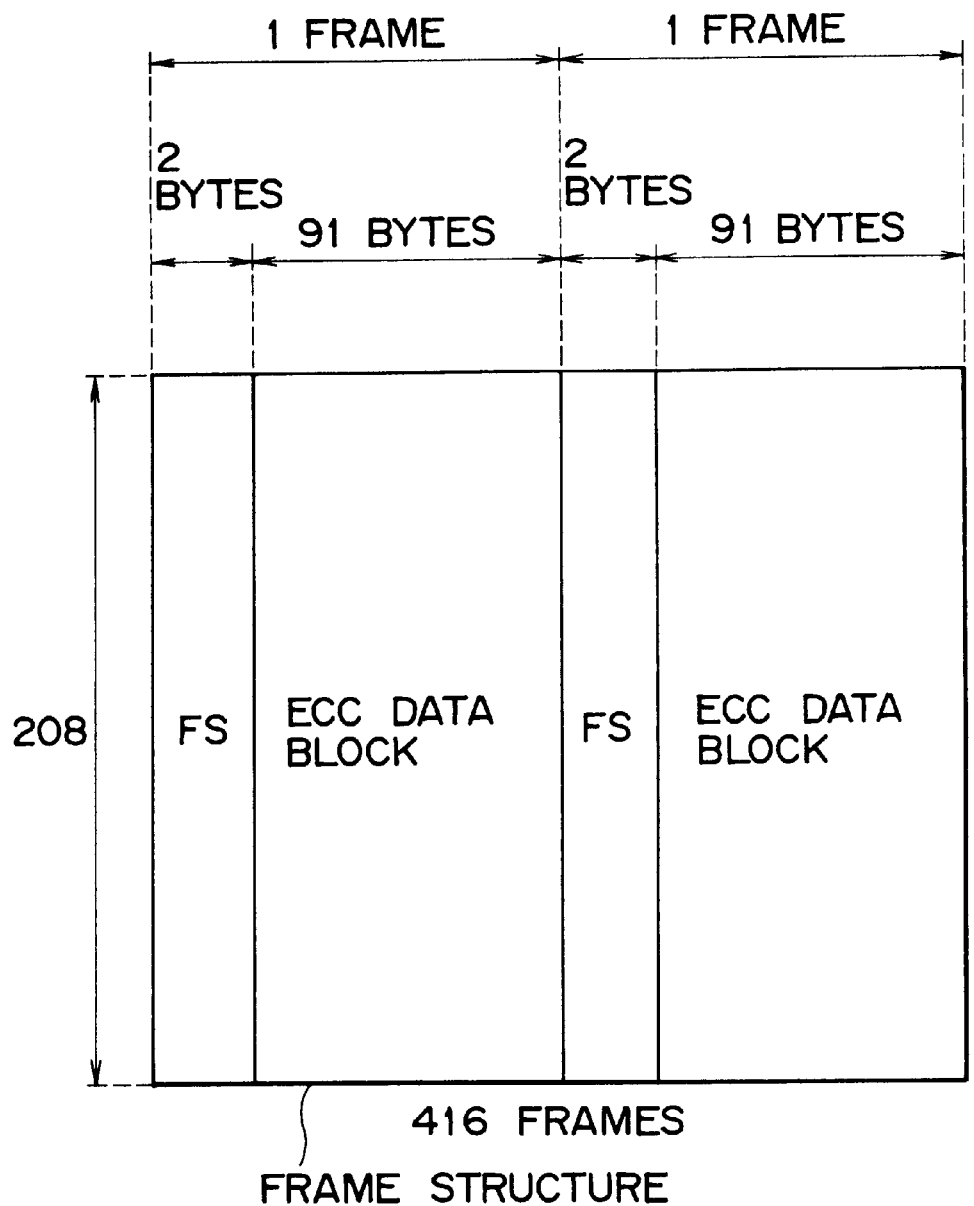
F I G. 12

DISC CARTRIDGE

BACKGROUND OF THE INVENTION

1. Field of the Invention

The present invention generally relates to a disc cartridge, and more particularly, relates to a disc cartridge which can be applied to an optical disc system. In the optical disc system of the present invention, an embedded member for relieving the shock in the gap between the shutter and the case of the optical disc system is provided. In addition, a sheet-like member is provided for cleaning the surface of an optical disc accommodated in the optical disc system so that the recording and playback characteristics can be effectively prevented from being deteriorated by the effects of dust particles and other foreign materials adhered to the surface of the optical disc.

2. Description of the Prior Art

The DVD (Digital Versatile Disc) has been proposed as an optical disc for use in a conventional optical disc drive for recording information onto the disc at a high recording density. By irradiation of a laser beam with a wavelength of 650 nm by means of an optical system with a numerical aperture of 0.6 upon a DVD, one side of the optical disc can be used for recording data of up to 2.6 MB in length. As a result, one side of the optical disc can be used for recording a video signal having a playback time of about 1 hour.

In such an optical disc drive, the desired data is recorded on and reproduced from an optical disc by adopting a non-contact technique. The optical disc is normally kept in a plastic case for preventing finger prints from being imprinted on the surfaces of the disc and for extended storage of the disc. When using the optical disc, the disc is removed from the plastic case and mounted on the optical disc drive.

Of course, in the case of a video tape recorder for home applications, the basic recording time is 2 hours. In order to allow the user to use an optical disc drive in the same way as the home video tape recorder, it is necessary for the optical disc drive to be capable of recording an even larger amount of data. In addition, in order to allow processing, such as editing to be performed through effective utilization of characteristics of the optical disc including a random access function, it is necessary to increase the recording time of the video signal to a length on the order of 3 hours. In a DVD system having such capabilities, it is necessary for the optical disc to be able to record data of up to about 8 MB.

As a result, it is necessary to record a video signal at a high recording density in the optical disc drive by means of an optical system having a high numerical aperture. As for the optical disc, it is necessary to further reduce the thickness of a light transmissive layer which allows a laser beam to pass therethrough in order to decrease the effect of a skew (bend or warp). However, deterioration of the recording and playback characteristics may result which is caused by dust particles and other foreign particles adhering to the surfaces of the optical disc.

In order to explain the problem described above in more detail, results of an experiment performed by using an optical disc drive having a numerical aperture of 0.8 and a light transmissive layer with a thickness of 0.1 mm are compared with results of an experiment performed by using an optical disc drive having a numerical aperture of 0.6 and a light transmissive layer with a thickness of 0.6 mm. As is shown in FIG. 25, if the numerical aperture is increased while the thickness of the light transmissive layer is reduced, even microscopic dust and other foreign particles adhered to the surfaces of the optical disc can cause a burst error. Such dust and other foreign particles continually accumulate on the surfaces of the optical disc. As a result, the recording and playback characteristics of the optical disc drive gradually deteriorate over extended use of the disk drive.

OBJECTS AND SUMMARY OF THE INVENTION

Therefore, it is an object of the present invention to provide a disc cartridge for an optical disc which avoids the aforementioned disadvantages of the prior art.

It is an additional object of the present invention to provide a disc cartridge which can be used for recording data at a higher recording density onto an optical disc accommodated in the disc cartridge in comparison with conventional disc cartridges.

Moreover, it is a further object of the present invention to provide a disc cartridge which is capable of effectively preventing deterioration of the recording and playback characteristics of the optical disc caused by the effects of dust particles and other foreign materials adhered to on the surface of the optical disc.

In order to solve the aforementioned problems, a disc cartridge is provided for accommodating and retaining an optical disc having data recorded onto and reproduced therefrom by irradiation of a laser beam wherein the optical disc can be rotated but cannot be easily removed therefrom. This disc cartridge includes a shock relieving or sealing member which surrounds the entirety or part of an opening formed on the housing of the disc cartridge which allows a laser beam to be irradiated onto the optical disc. This shock relieving or sealing member is also used for closing a gap formed between a shutter and a peripheral member of the opening of the disc cartridge for preventing and/or reducing the amount of dust particles and/or foreign materials entering the opening and being adhered to the optical disk.

In addition, the cartridge disc is also provided with a movement restricting mechanism for retaining the optical disc and limiting movement of the shutter.

Moreover, the disc cartridge also has sheet-like members provided on at least one surface of the optical disc for cleaning the surface of the optical disc so that when the optical disc is rotated in the disc cartridge, foreign materials adhered to the surface of the optical disc are absorbed by the sheet-like member.

Furthermore, the disc cartridge is also provided with pressing members for pressing the sheet-shaped members against the surfaces of the optical disc. The sheet shaped members can each face a surface of the optical disc and are joined with each other to form a single assembly having a shape resembling an envelope for enclosing the optical disc therein. The sheet-shaped members are formed to cover both the surfaces of the optical disc except a portion in close proximity to the rotational center of the optical disc and an area that would otherwise disturb an incident laser beam coming from the opening if covered by the sheet-shaped members.

As described above, an optical disc is accommodated and retained in a disc cartridge of the present invention so that the optical disc can be rotated but cannot be easily removed therefrom. This disc cartridge includes a shock relieving or sealing member which surrounds the entirety or part of an opening formed on a housing of the disc cartridge to allow a laser beam to be irradiated upon the optical disc. This disc cartridge is further used to close a gap between the shutter and the peripheral portion of the opening of the disc cartridge. As a result, the amount of dust particles and other foreign material intruding onto the surfaces of the optical disc can be reduced.

In addition, since the cartridge disc is also provided with a movement restricting mechanism for holding the optical disc and for limiting the movement of the shutter, the shutter can be prevented from being opened and closed carelessly, allowing the amount of dust particles and other foreign materials intruding onto the surfaces of the optical disc to be reduced.

Moreover, the disc cartridge also has sheet-like members provided on at least one surface of the optical disc for cleaning the surfaces of the optical disc so that dust particles and other foreign materials intruding into the inside of the disc cartridge can be prevented from being accumulated on the surfaces of the optical disc.

Furthermore, since the disc cartridge is also provided with pressing members for pressing the sheet-shaped members against the surfaces of the optical disc, the effect of the cleaning by using the sheet-shaped members can be enhanced.

The sheet-liked members each face a surface of the optical disc and are joined with each other to form a single assembly having a shape resembling an envelope for enclosing the optical disc therein. As a result, the amount of dust and other foreign materials adhered to the surfaces of the optical disc which have intruded into the disc cartridge can be reduced.

As described above, the sheet-shaped members are formed to cover both the surfaces of the optical disc except a portion in close proximity to the rotational center of the optical disc and an area that would otherwise disturb an incident laser beam coming from the opening if covered by the sheet-shaped member. As a result, only a minimum area of each surface of the optical disc is not exposed to the sheet shaped member, allowing the optical disc to be cleaned with a high degree of efficiency.

BRIEF DESCRIPTION OF THE DRAWINGS

The following detailed description, given by way of example, will best be understood in conjunction with the accompanying drawings in which:

FIGS. 4A, 4B, 4C1 and 4C2 are diagrams showing the configuration of a sector resulting from the zoning shown in FIG. 3.

FIG. 12 is a diagram used for explaining the structure of a frame handled by the data processing system of the optical disc drive shown in FIG. 9.

DETAILED DESCRIPTION OF CERTAIN PREFERRED EMBODIMENTS

Figure 2:
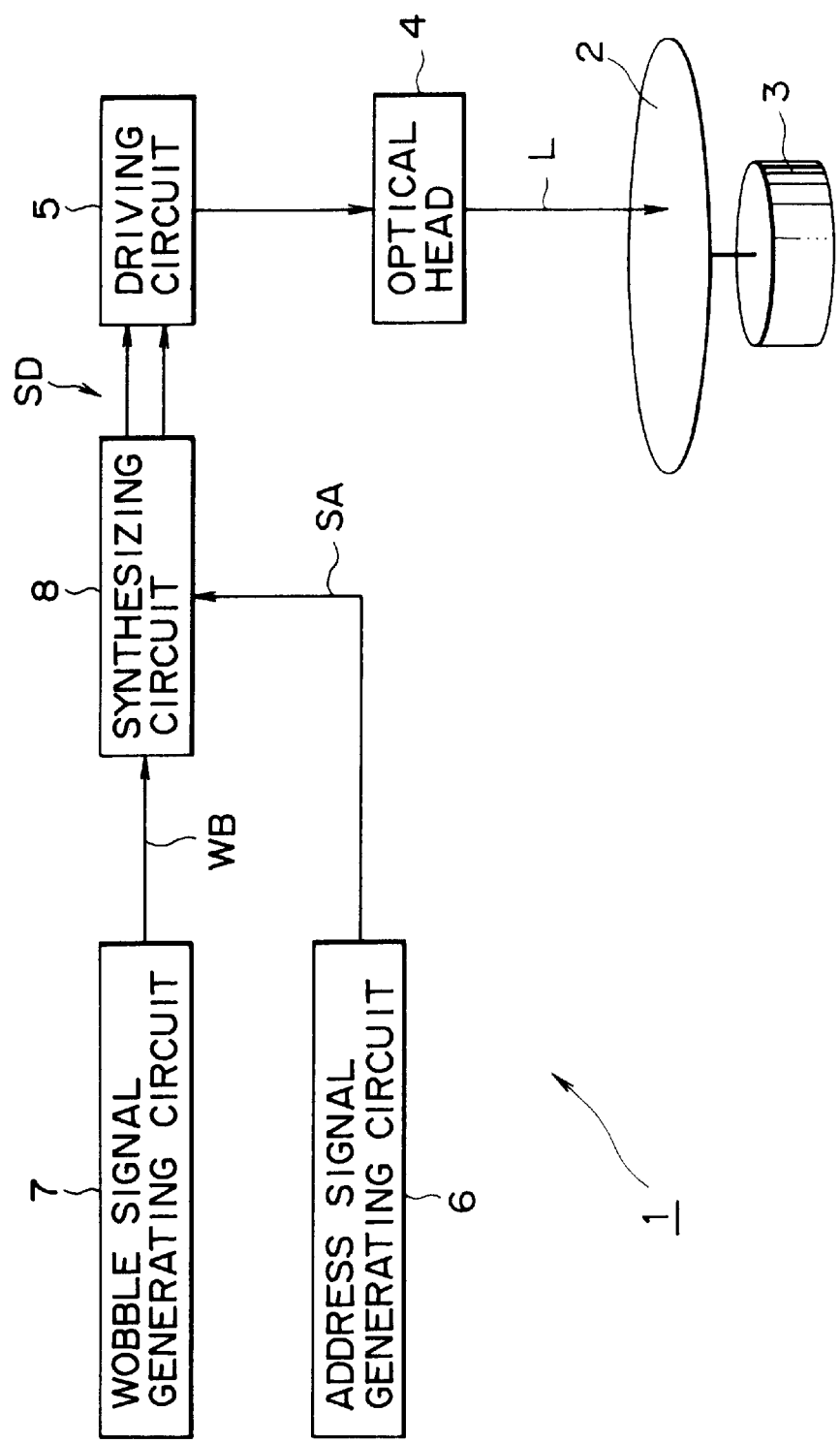
FIG. 2 is a block diagram showing a mastering apparatus 1 used for zoning of the optical disc shown in FIG. 1.

Referring now to the drawings, wherein like numerals are used throughout, and in particular to FIG. 2, there is illustrated a mastering apparatus 1 used as part of an embodiment of the present invention. In a process for manufacturing an optical disc in accordance with this embodiment, a raw plate 2 of the optical disc undergoes an exposure process in the mastering apparatus 1 allowing the optical disc to be produced from the raw plate 2.

In the mastering apparatus 1, the raw plate 2 of an optical disc is typically made by coating the surface of a glass plate with resin and driving the glass plate into rotation by means of a spindle motor 3 at a fixed rotational speed.

An optical head 4 driven by a thread mechanism irradiates a laser beam L to the surface of the disc raw plate 2 while moving from an innermost circumference of the disc raw plate 2 to an outermost circumference thereof in synchronization with the rotation of the disc raw plate 2. In this way, the optical head 4 forms a track having a shape resembling a spiral extended from the innermost circumference of the disc raw plate 2 to the outermost circumference thereof. During the process of forming such a track, the optical head 4 is controlled by the thread mechanism to move in the radial direction of the disc raw plate 2 by about 1.0 microns in each rotational period of the disc raw plate 2. As a result, the spiral shaped track is formed at a track pitch of 0.5 microns, a pitch useful in the so-called land and groove recording. It should be noted that the track pitch for the land and groove recording is 1/1.48 times a track pitch of 0.74 microns in a DVD.

In the disc manufacturing process described above, the mastering apparatus 1 is capable of producing an optical disc from the disc raw plate 2 and allows data to be recorded at a line recording density of about 0.21 microns/bit. A relation (1) given below indicates that data of up to 8 GB in length can be recorded in the optical disc.

$$4.7 \times \frac{0.74 \times 0.267}{0.5 \times 0.21} \tag{1}$$

In the above relation (1), 4.7 is the recording capacity of a DVD expressed in terms of GB, 0.74 is the track pitch of the DVD expressed in terms of microns, and 0.267 is the line recording density of the DVD expressed in terms of microns/bit. The expression in the relation (1) thus indicates a recording capacity that can be achieved by the same processing as a DVD.

In addition, in the process of creating an optical disc from the disc raw plate 2, the optical head 4 sets the spot diameter of the laser beam L at such a value that a groove formed by exposure to the laser beam L has a width all but equal to the width of an inter-groove land adjacent to the groove. It should be noted that, in this case, the shape of the spot and the light quantity of the laser beam L are set at such values that the effective exposure range generated by the laser beam L is increased to a value on the order of approximately 120% with respect to the width of the groove, the final target of the process. In this way, the optical head 4 puts the disc raw plate 2 in an exposure process so as to allow data to be recorded on lands and grooves on the optical disc produced from the disc raw plate 2.

Furthermore, the optical head 4 is designed so that the optical system is capable of moving in the radial direction of the disc raw plate 2.

Figure 3:
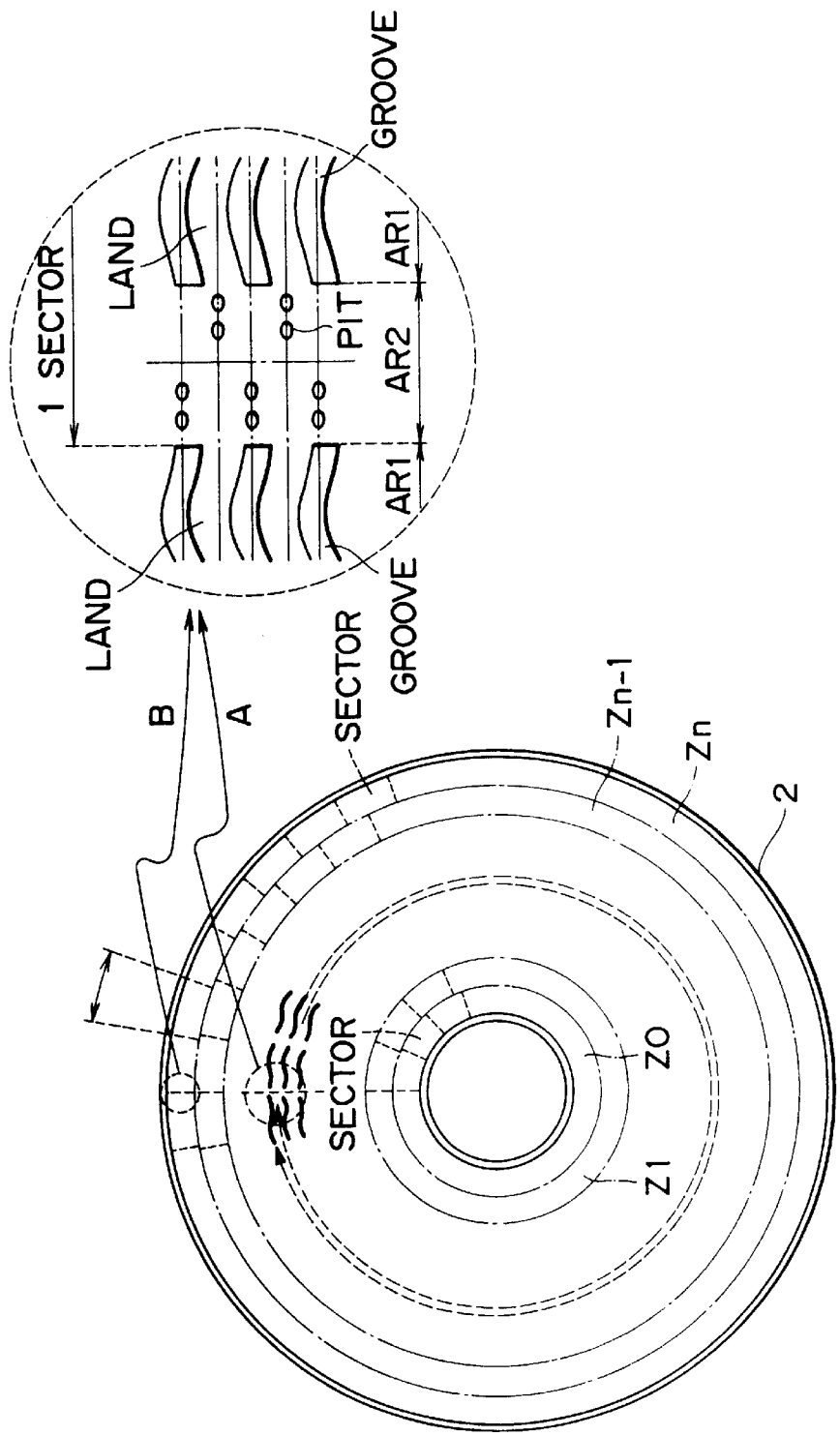
FIG. 3 is a diagram used for explaining the zoning of the optical disc.

A driving circuit 5 is used for driving the optical head 4 in accordance with a driving signal SD. In driving the optical head 4, the driving circuit 5 changes a driving condition of the optical head 4 with timing synchronized to the rotation of the disc raw plate 2 in accordance with the irradiation position of the laser beam L. In this way, a zoning process is performed on the disc raw plate 2 as shown in FIG. 3. In FIG. 3, grooves and pits are shown with the expressions thereof made for exemplary purposes.

More particularly, the mastering apparatus 1 forms track circles sequentially one after another on the disc raw plate 2 with a radius in the range of from 24 mm to 58 mm on the information recording surface of the optical disc which has a diameter of 120 mm (e.g. equal to the diameter of a compact disc). At that time, the driving circuit 5 switches the driving condition of the optical head 4 so as to form a sector structure by division of the information recording surface into areas each with a radiation shape. Furthermore, by sequentially changing the timing for switching the driving condition of the optical head 4 step-by-step as the optical head 4 is moved from the innermost circumference of the disc raw plate 2 to the outermost circumference thereof, the information recording surface can be divided into concentric circular areas allowing 14 zones Z0 to Zn to be formed.

While changing the switching timing, the driving circuit 5 creates 9 sectors in 1 track in the zone Z0 on the innermost circumference and, as the optical head 4 is displaced to the zone Z1 on an outer circumference adjacent to the innermost circumference, the number of sectors per track is incremented by 1. While the optical head 4 is being displaced sequentially from one zone to an adjacent zone, the number of sectors per track is incremented by 1.

The boundary between two adjacent sectors is shown in an enlarged diagram indicated by arrows A and B in FIG. 3. As shown in the enlarged diagram, the head of a sector is allocated as an address area AR2 and an address AR1 following the address area AR2 is allocated as a user area. Controlled by a system control circuit (not shown), the driving circuit 5 varies the radiation position of the laser beam L in the user area AR1 in accordance with the driving signal SD so as to form a groove in the user area AR1 into a zigzag shape.

At the front half of the address area AR2, on the other hand, the displacement of the radiation position of the laser beam L is stopped and the light quantity of the laser beam L is increased intermittently in accordance with the driving signal SD in order to create an array of pits at the center of the track aligned with a groove. At the rear half of the address area AR2, on the contrary, the radiation position of the laser beam L is displaced to the center of the track aligned with a land on the inner circumference side and the light quantity of the laser beam L is raised intermittently in accordance with the driving signal SD in order to create an array of pits at the center of the track aligned with the land.

In this way, the driving circuit 5 records address data of sectors on a subsequent groove by using an array of pits created at the center of the track for the sectors at the front half of the address area AR2. In addition, the driving circuit 5 records address data of sectors on a subsequent land on the inner circumference side by using an array of pits created at the center of the track for the sectors at the rear half of the address area AR2.

When an optical disc is produced from the disc raw plate 2, the driving circuit 5 sets the quantity of light at the time the laser beam L is radiated at such a value that each pit and each groove are created with a depth equal to ⅙ to ⅕ of the 650 nm wavelength of laser beam L. It should be noted that each groove is formed into a zigzag shape with an amplitude in the range 15 nm to 30 nm.

A wobble signal generating circuit 7 is used for generating a sinusoidal signal with a predetermined frequency synchronized to the rotation of the disc raw plate 2. This sinusoidal signal is referred to as a wobble signal WB. In the generation of the wobble signal WB, the wobble signal generating circuit 7 sequentially increases the frequency of the sinusoidal signal step-by-step in the zoning process described with reference to FIG. 3. As a result, the wobble signal WB generated by the wobble signal generating circuit 7 causes the radiation position of the laser signal L to be displaced, allowing a groove to be formed into a zigzag shape with 397 periods per sector.

In this way, the length of the address area AR2 which is also referred to as an header area is set at a value corresponding to 5 periods of a groove and, along the track in the zone Z0 on the innermost circumference, a groove is formed into a zigzag shape having 3,573 periods. As the optical head 4 is moved to an adjacent zone on an outer circumference, a groove is created along the track in the zone into a zigzag shape with the number of periods per track increased by 397. It should be noted that, in the present embodiment, in each period in the user area AR1 of a groove, data of 25 bytes in length can be recorded and the length of a period is set at about 42 microns.

Figure 4:
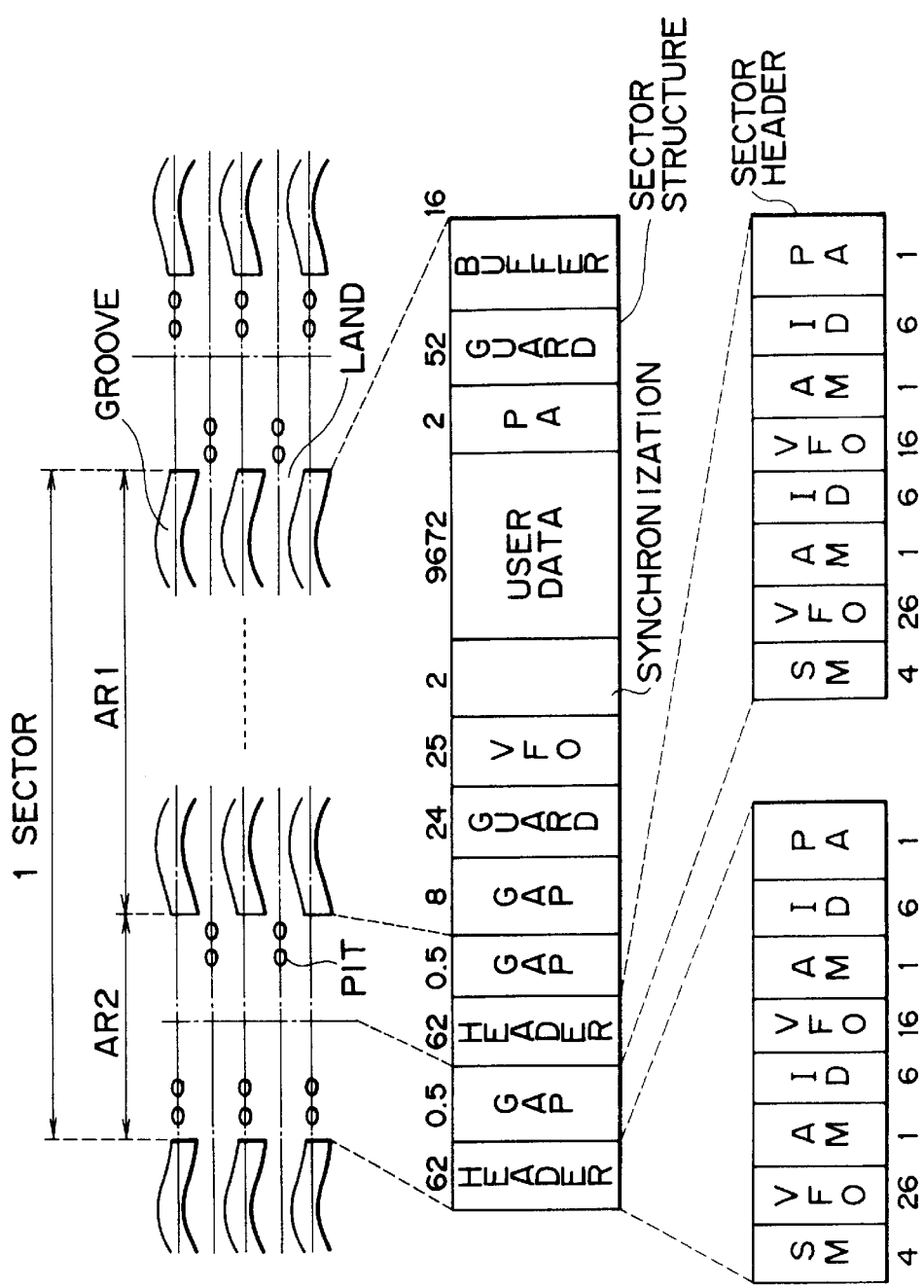

Controlled by the system control circuit (not shown), an address signal generating circuit 6 is used for generating an address signal SA, the value of which sequentially changes in accordance with the displacement of the optical head 4. More specifically, the address signal generating circuit 6 receives a timing signal such as an FG signal synchronized to the rotation of the disc raw plate 2 from a source such as the spindle motor 3 and counts the number of pulses in the timing signal by means of a predetermined counter. The address signal SA output by the address signal generating circuit 6 represents an address data ID of the radiation position of the laser beam L shown in FIGS. 4A, 4C1 and 4C2. The number of bytes in a piece of data are each numerically represented in FIG. 4.

As shown in FIGS. 4B, 4C1 and 4C2, the address signal generating circuit 6 generates a sector header to be allocated to the front and rear halves of an address area AR2 by adding a sector mark SM, timing data VFO for synchronization use, an address mark AM and a post amble PA to the address sector data ID. Here, the address signal generating circuit 6 generates sector headers each having a length of 62 bytes to represent 8 Kbyte data recorded in the user area AR1. The sector mark SM is 4-byte data used for indicating the beginning of a sector header. Two pieces of timing data VFO for synchronization are included in an address data ID for placing a PLL circuit employed in the optical disc drive in a locked state. The timing data VFO closer to the beginning of the sector header has a length of 26 bytes whereas the other timing data VFO is 16 bytes in length.

The address mark AM is an address synchronization signal having a length of 1 byte. The address data ID is 6 bytes in length, two bytes of which are allocated as an error detection code. The same address data ID is recorded at two locations in order to improve reliability. The post amble PA is 1 byte in length and used for setting the polarity of a signal.

The address signal generating circuit 6 converts the selector header generated as such into serial data and then modulates the serial data in a predetermined format. The address signal generating circuit 6 further outputs the modulated signal as the address signal SA. Strictly speaking, the address signal generating circuit 6 outputs the address signal SA with timing tailored to a scanning operation using the laser beam L.

A synthesizing circuit 8 is used for synthesizing the wobble signal WB and the address signal SA in order to generate the driving signal SD which serves as a displacing signal for displacing the optical system of the optical header 4 as well as a light quantity control signal for controlling the light quantity of the laser beam L. The driving signal SD is supplied to the driving circuit 5.

The information recording surface of an optical disc made from the disc raw plate 2 is divided into concentrically circular zones which are created and preformatted in a preformatting operation so that the number of sectors in a zone gradually increases as the preformatting operation moves from a zone on an inner circumference to a zone on an outer circumference adjacent to the inner circumference. In addition, at the head of each sector, an address area AR2 is created for recording the address of the sector in the subsequent groove and the address of a sector in the subsequent land. A user area AR2 which follows the address area AR1 is used for recording desired data.

In the present embodiment, a 0.5-byte gap is sandwiched between the address area AR1 and the user area AR2 on the address area side and a 8-byte gap on the user area side as shown in FIG. 4B. The user area AR2 comprises a 24-byte guard, a 25-byte VFO, a 2-byte synchronization code, 9,672-byte user data, a 1-byte post amble (PA), a 52-byte guard and a 16-byte buffer which are laid out therein sequentially one after another.

The gap is a land/groove switching area as well as a switching area of the light quantity of the laser beam L. The guard is provided for improving the overwrite cycle of the recording area by suppressing the flowability of the recording material in an overrecording operation wherein a variable phase medium is used as a recording medium. The synchronization code is provided for putting a PLL circuit employed in the optical disc drive in a locked state. The post amble is provided for setting the polarity of the signal. Finally, the buffer is a redundant region in the recording area used for absorbing jitters generated by eccentricity or the like.

Figure 5:
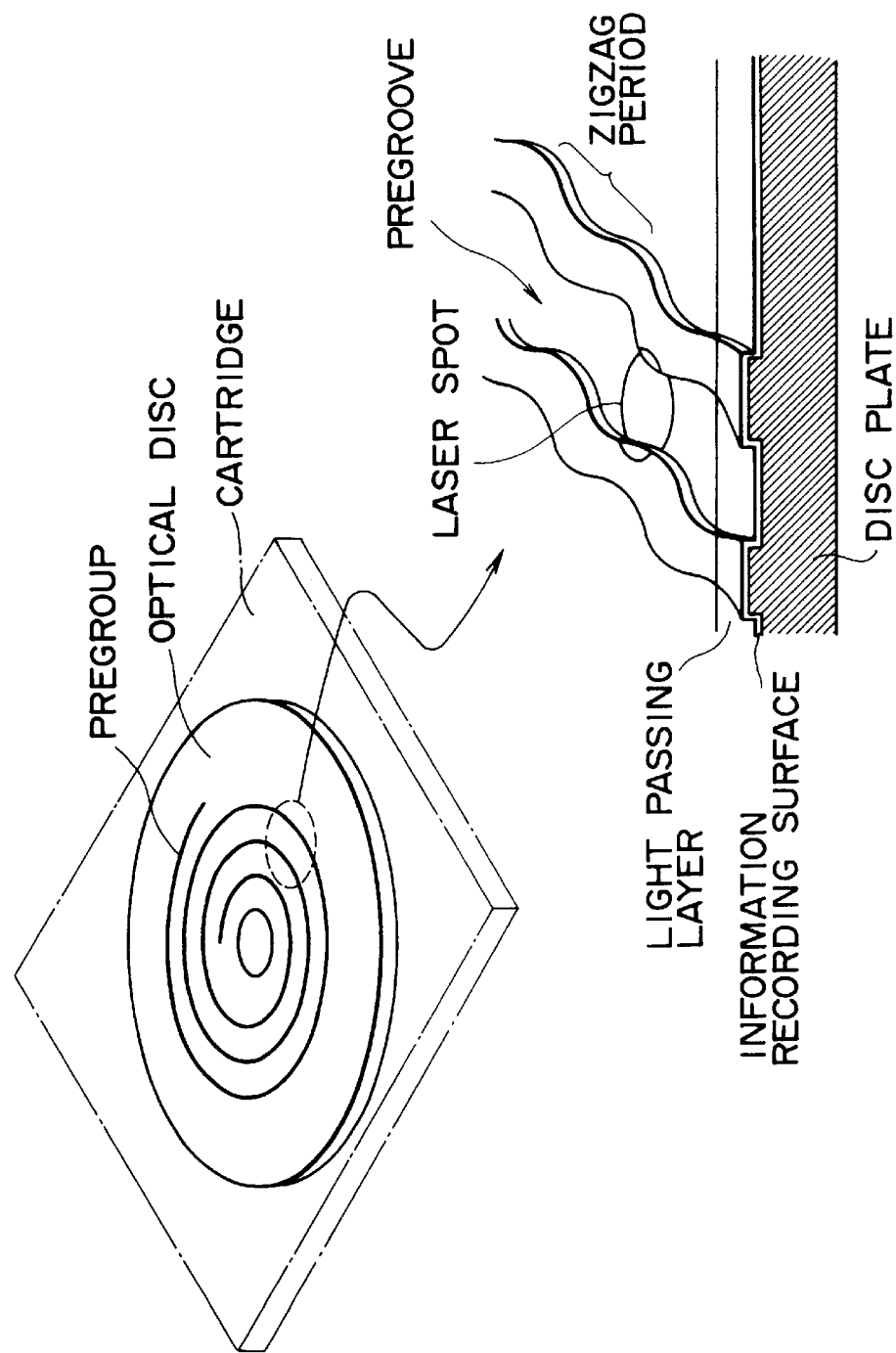
FIG. 5 is a schematic diagrammatic view of an optical disc manufactured by the mastering apparatus of FIG. 2.

FIG. 5 is a diagram showing a perspective view of an optical disc made from the disc raw plate 2 and a diagram showing the cross section of a groove cut out from the optical disc. The optical disc is made from a plate which in its entirety has a thickness of 1.2 mm. On the plate of this variable phase optical disc, an information recording surface is formed by sequentially providing an aluminum layer, a ZnS-SiO2 layer, a GeSbTe layer and a ZnS-SiO2 layer one layer after another. In the case of a photo-magnetic disc, on the other hand, an information recording surface is formed on the plate of the disc by sequentially providing an aluminum layer, an SiN layer, a TbFeCo layer and an SiN layer one layer after another. As for a disc of a postscript type, an information recording surface is formed on the plate of the disc by sequentially providing an aluminum layer or a metallic sputter layer and a predetermined organic coloring matter layer one layer after another.

On the information recording surface, a light transmissive layer having a thickness of about 0.1 mm is formed for passing the laser beam therethrough and passing the laser beam to the information recording surface. Thus, the optical disc provided by the present embodiment is capable of effectively eliminating any effect of a skew (bend or warp), allowing operations to record data into the information recording surface and to play back the data from the information recording surface to be performed with a high degree of reliability even if a laser beam is irradiated from an optical system with a high numerical aperture to the information recording surface through the light transmission layer.

The optical disc has a diameter of 120 mm to include an information recording area having a radius in the range of between approximately 24 mm to 58 mm on the surface thereof.

In addition, the optical disc is accommodated and retained in a predetermined disc cartridge which is designed so that the type of the optical disc accommodated therein can be identified. Furthermore, each disc cartridge is made so that it can be mounted on an optical disc drive and the effects of dust particles or other foreign material can be eliminated even if access to the information recording area of the optical disc is made from an optical system having a high numerical aperture.

A variable phase optical disc is made so that, in an operation to record desired data into the variable phase optical disc, the irradiation of a laser beam locally changes the crystal structure of the information recording surface allowing the desired data to be recorded thereon. However, in an operation to play back data from the optical disc, changes in light quantity of the reflected light are detected as a playback signal of the data recorded on the optical disc.

A photo-magnetic disc is made so that, in an operation to record desired data onto the photo-magnetic disc, a magnetic field is applied to the radiation location of the laser beam on the information recording surface, recording the desired data thereon in a thermal magnetic recording process. However, in an operation to play back data from the photo-magnetic disc, the plane of polarization of a reflected light is detected as a magnetic Kerr effect, allowing the data recorded on the photo-magnetic disc to be played back.

An optical disc of the postscript type is made so that, in an operation to record desired data into the optical disc of the postscript type, the radiation of a laser beam locally destroys the information recording surface of the optical disc, allowing the desired data to be recorded thereon. However, in an operation to play back data from the optical disc, changes in light quantity of a reflected light are detected as a playback signal of the data recorded on the optical disc.

During the process of making either of the optical discs described above, in each zone, while the disc raw plate 2 is being rotated at a fixed rotational speed, the frequency of a wobble signal WB is sequentially varied step-by-step in order to create a groove by using the wobble signal WB. Thus, the optical disc being made experiences a zoning process for creating a fixed zigzag period of a groove determined by the rotational speed of the optical disc.

In addition, the mastering apparatus provided by the present embodiment is capable of making two types of optical discs, that is, a single-sided optical disc with an information recording surface provided on only one surface thereof and a double-sided optical disc with each of the surfaces thereof serving as an information recording surface. A double-sided optical disc with each of the surfaces thereof serving as an information recording surface is produced by joining two optical discs each having a thin disc plate to obtain a thickness of about 1.2 mm and light transmissive layers each with a thickness of about 0.1 mm.

Figure 6:
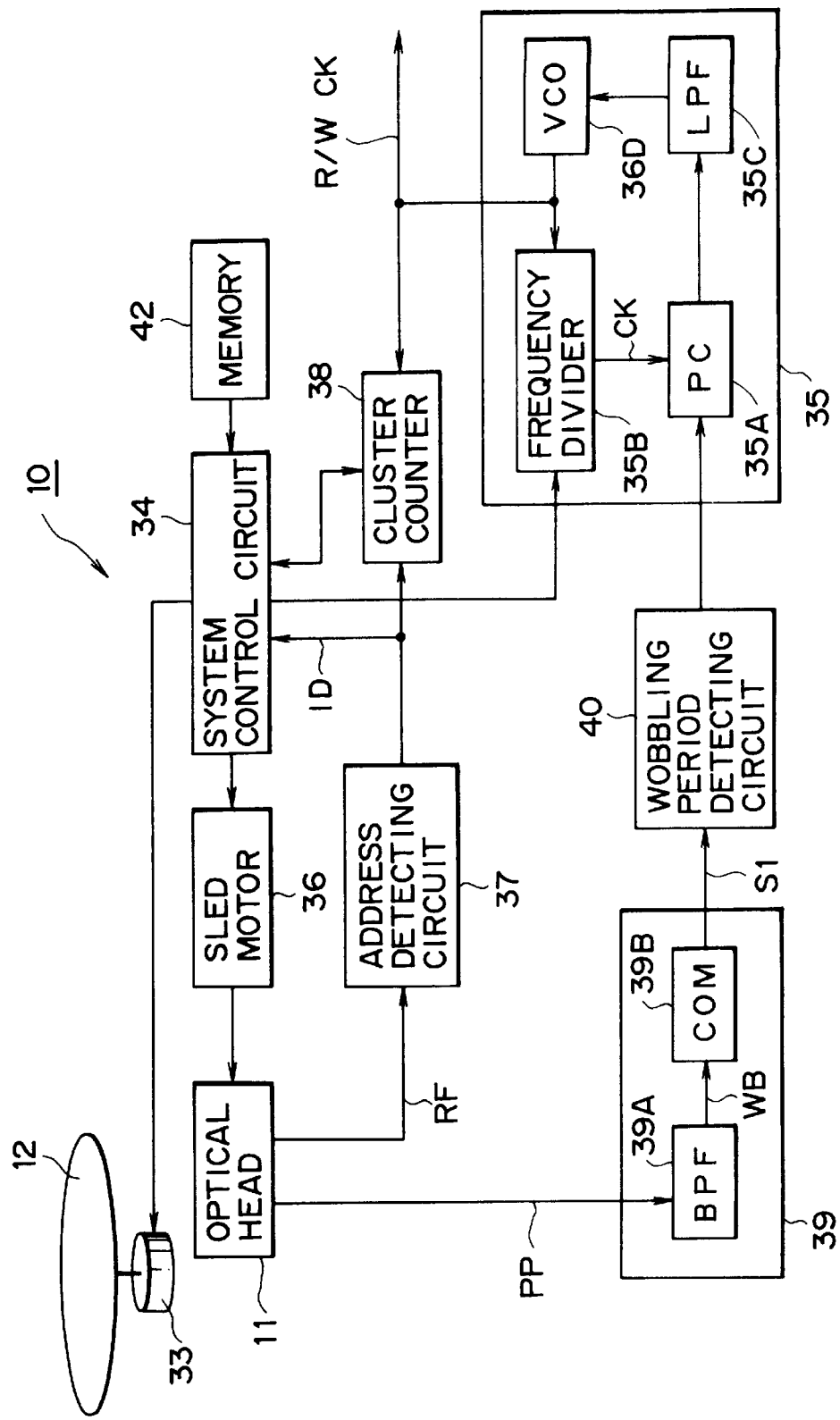
FIG. 6 is a block diagram showing an optical disc drive for making accesses to the optical disc shown in FIG. 5.

FIG. 6 is a block diagram illustrating an optical disc drive 10 for making accesses to an optical disc 12 made in a process described above by focusing on a system for processing a wobble signal. In the optical disc drive 10, a laser beam is irradiated from an optical head 11 to the optical disc 12. The optical head 11 is also used for receiving light reflected by the optical disc 12.

Figure 7:
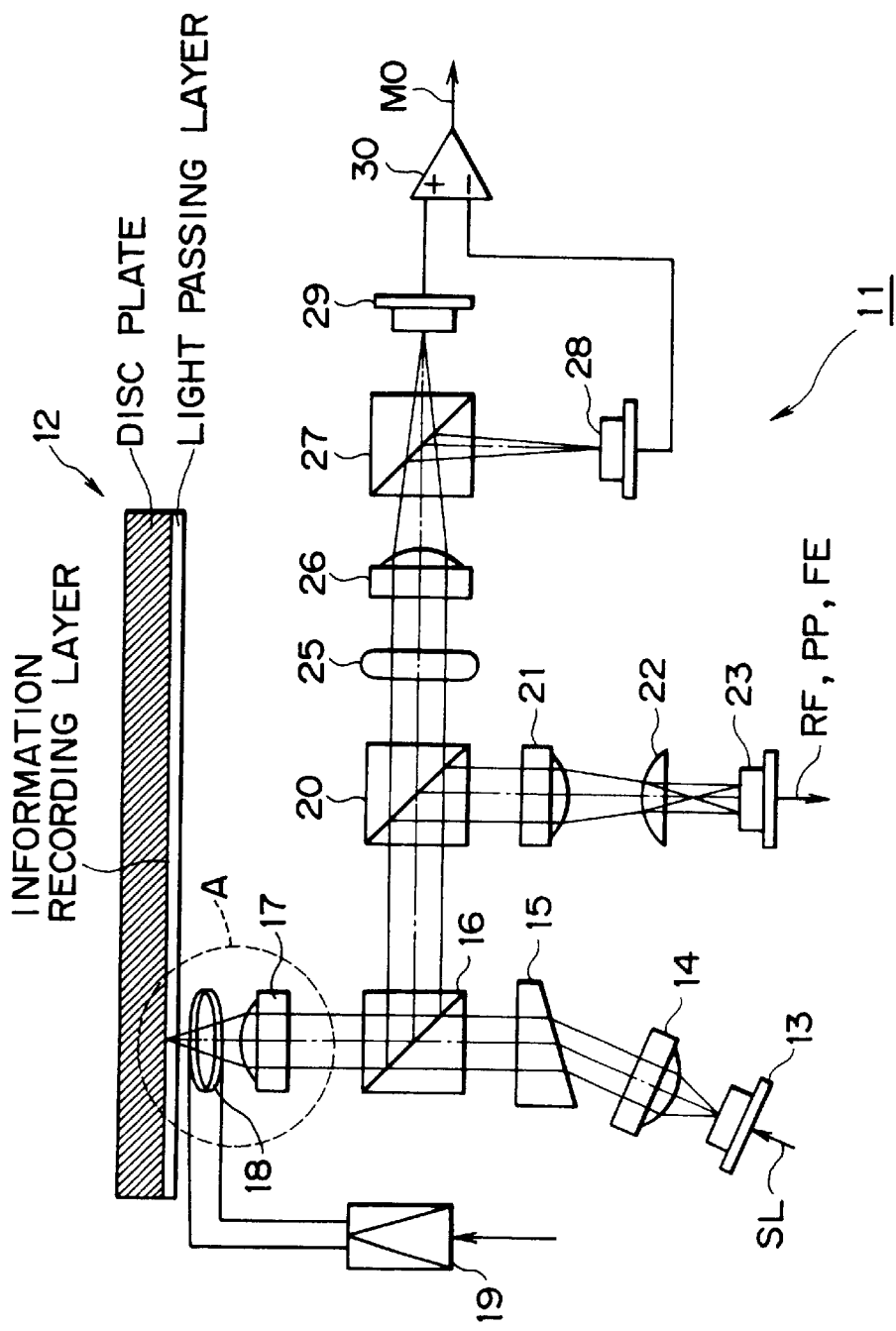
FIG. 7 is a block diagram showing an optical head employed in the optical disc drive shown in FIG. 6.

More specifically, a semiconductor laser 13 employed in the optical head 11 is driven by a predetermined driving signal SL to irradiate a laser beam with a wavelength of 650 nm as shown in FIG. 7. In a playback operation, the semiconductor laser 13 radiates a laser beam having a fixed quantity of light. However, in a recording operation, the semiconductor laser 13 radiates a laser beam by raising the quantity of light thereof intermittently. In the present embodiment, by increasing the quantity of light, pits and marks can be formed on the information recording surface of the optical disc 12.

A collimator lens 14 placed on the optical path after the semiconductor laser 13 converts laser beams irradiated by the semiconductor laser 13 into parallel lights. A correcting lens 15 following the collimator lens 14 corrects the astigmatism of the laser beams. After correction by the correcting lens 15, the laser beams are supplied to an objective lens 17 by way of a beam splitter 16.

The objective lens 17 focuses the laser beams supplied thereto on the information recording surface of the optical disc 12 as well as receives a beam reflected by the information recording surface. In the case of an optical disc 12 serving in the optical disc drive 10 as an optical disc for playback purposes only, data recorded on the optical disc 12 can be played back as detectable changes in light quantity of the reflected laser beam. If the optical disc 12 is an optical disc of the variable phase type, desired data is recorded on the information recording surface by locally changing the crystal structure at a radiation position of the focused laser beam. Similar to the ordinary optical disc 12, data recorded on the variable phase optical disc can be played back as detectable changes in light quantity of a reflected laser beam.

If the optical disc 12 is an optical disc of the postscript type, desired data is recorded on the information recording surface by locally destroying a radiation position of the focused laser beam. Similar to the ordinary optical disc 12, data recorded on the subscript type optical disc can be played back as detectable changes in light quantity of a reflected laser beam. If the optical disc 12 is a photo-magnetic disc, desired data is recorded on the information recording surface by adopting a thermal magnetic recording technique wherein a modulation coil 18 provided at a location in close proximity to the objective lens 17 is driven by a driving circuit 19 to apply a predetermined modulating magnetic field to a radiation position of the focused laser beam. Data recorded on the photo-magnetic disc can be played back as detectable changes in a plane of polarization of the reflected laser beam.

As described above, the laser beam supplied by the correcting lens 15 passes through a beam splitter 16 and thereafter passes to the objective lens 17. As shown in FIG. 7, the beam splitter 16 also reflects light returned by the objective lens 17 to another beam splitter 20 by way of a separate optical path.

The beam splitter 20 reflects the reflected light passing thereto and splits the reflected light into two beams. One of the split beams reflected by the beam splitter 20 is supplied to a lens 21 for converging the beam into a focused beam. A cylindrical lens 22 provides astigmatism to the beam converged by the lens 21. An optical detector 23 receives a beam output by the cylindrical lens 22.

The optical detector 23 has its light receiving surface divided into light receiving areas each having a predetermined shape, allowing results of receiving lights provided by the light receiving areas to be output. In the optical detector 23, a current-to-voltage conversion circuit (not shown) converts currents representing the results of receiving lights provided by the light receiving areas into voltages which then undergo addition and subtraction processing in a matrix circuit to finally generate a playback signal RF. The level of this playback signal RF varies in accordance with (1) the light quantity of the reflected beam, (2) a push-pull signal PP dependent upon the displacement of the radiation position of the laser beam relative to a groove or an array of pits, and (3) a focus error signal FE dependent upon a defocus quantity.

On the other hand, a ½ wavelength plate 25 receives a reflected beam passing through the beam splitter 20. In the ½ wavelength plate 25, the plane of polarization of the reflected beam is changed in order to radiate a light at a plane of polarization appropriate for separation of the reflected light at a polarization beam splitter 27 to be later described. A lens 26 converts the reflected light radiated by the ½ wavelength plate 25 into a converged beam which is supplied to the polarization beam splitter 27 for reflecting a predetermined polarization component of the converged beam and passing through the rest thereof. The polarization beam splitter 27 thus splits the converged beam supplied thereto by the lens 26 into two beams with the quantities of light thereof varying in a mutually complementary way in accordance with the plane of polarization of the reflected beam.

Optical detectors 28 and 29 respectively receive the two beams resulting from the splitting done by the polarization beam splitter 27 and outputs results of receiving lights each with a signal level varying in accordance with the light quantity of the received beam. A difference amplifier 30 receives the results of receiving lights from the optical detectors 28 and 29 through current-to-voltage conversion circuits (not shown) and outputs a playback signal MO with the level thereof varying in accordance with the plane of polarization of the reflected beam as a result of differential amplification of the results of receiving lights.

In this manner, the optical head 11 is capable of recording desired data into a variety of optical discs 12 and playing back data recorded therein.

Figure 8:
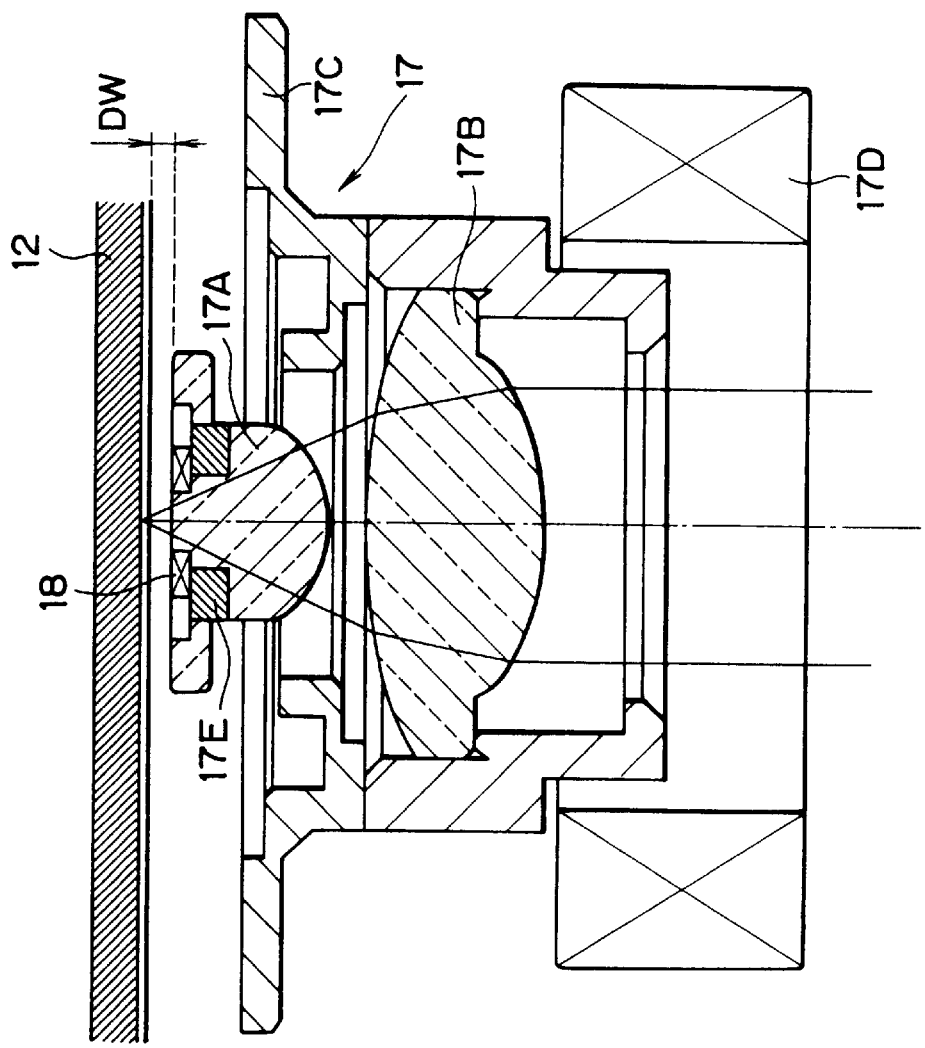
FIG. 8 is a cross-sectional diagram showing a peripheral configuration of an objective lens used in the optical head shown in FIG. 7.

FIG. 8 is a cross-sectional diagram showing the configuration of peripherals of the objective lens 17 employed in the optical head 11. As shown in the figure, the objective lens 17 comprises a first lens 17A and a second lens 17B which are each implemented by a plastic lens having non-spherical surfaces and are held as an assembly by a predetermined holding member 17C. A driving actuator 17D moves the first and second lenses 17A and 17B between the upward and downward directions as well as the right and left lateral directions. With such an arrangement, by moving the assembly comprising the first and second lenses 17A and 17B, the optical disc drive 10 is capable of performing tracking control and focus control.

The second lens 17B which is located on the incidence side of the laser beam has a relatively large mouth diameter. On the other hand, the first lens 17A which is located on the side of the optical disc 12 has a relatively small mouth diameter. The focus distances of the first and second lenses 17A and 17B and the gap between the first and second lenses 17A and 17B are set so that the objective lens 17 has a numerical aperture of 0.78.

As a result, the objective lens 17 satisfies equations (2) and (3) given below. As set forth herein, the symbol $\lambda$ used in the equations is the wavelength of the laser beam and NA is the numerical aperture of the objective lens 17. The symbol t denotes the thickness of the light transmissive layer of the optical disc 12 and a notation $\Delta t$ represents a variation in thickness t. Finally, the symbol $\theta$ is a skew margin of the optical disc 12.

$$\Delta t \leq \pm 5.26 \times \frac{\lambda}{NA^4} [\mu m] \quad (3)$$

Equation (2) represents a relation between the skew margin $\theta$ allowing accesses to the optical disc 12 to be made in a stable manner and in accordance with the optical system as disclosed in Japanese Patent Laid-Open No. Hei3-225650. Currently mass produced compact discs have a skew margin $\theta$ on the order of 0.6. As for the DVD, the skew margin $\theta$ is set at a value on the order of 0.4. As a result, accesses to the optical disc 12 can be made in a manner sufficiently stable even if the thickness t of the light transmission layer is set at 0.1 mm and the numerical aperture NA of the optical system is set at a relatively large value.

Equation (3) shows a variation $\Delta t$ in thickness t of the light transmissive layer that is allowed in this optical system. A constant of 0.526 is used in equation (3) to represent a value computed by using a compact disc as a reference. The variation $\Delta t$ has a value in the range of between approximately −100 microns to +100 microns for a compact disc or in the range of between approximately −30 microns to +30 microns for a DVD. As a result, in the optical disc drive 10, accesses to the optical disc 12 can be made in a stable way even if the thickness t of the light transmissive layer varies.

In addition, the optical head 11 irradiates a laser beam with a wavelength of 650 nm to the surface of the optical disc 12 by way of the optical system having a numerical aperture of 0.78, satisfying the following equation (4):

$$8 \approx 4.7 \times \left[ \frac{0.65}{0.60} \times \frac{NA}{\lambda} \right]^2 \quad (4)$$

where the constant 4.7 in equation (4) is the recording capacity of the DVD expressed in terms of GB, the number 0.65 is the wavelength of the laser beam applied to the DVD expressed in terms of nm, and the number 0.6 is the numerical aperture of the optical system. In this way, in the optical head 11, data is processed in the same format as the DVD and a recording capacity of about 8 GB can be attained.

In the objective lens 17, the first lens 17A is retained in a position protruding toward the optical disc 12. In this position, the first lens 17A is retained at a working distance DW proper for the numerical aperture. In the present embodiment, the characteristics and layout of the first and second lenses 17A and 17B are properly selected while the working distance DW is set at 560 microns. As a result, the tolerance of eccentricity between the lens surfaces of the object lens 17, the face angle tolerance and the lens curvature can each be set in a range that allows sufficient mass production of the optical head 11 to be implemented. In addition, the size of the optical system can be made relatively small and collisions with the optical disc 12 can be effectively avoided.

In particular, in the optical head 11, if the numerical aperture is increased while the diameter of the incident laser beam is kept at the same value, the objective lens 17 must be placed at a location closer to the information recording surface of the optical disc 12. Thus, if an attempt is made to place the optical head 11 by reserving a sufficient gap between the optical disc 12 and the optical head 11, the diameter of the laser beam must be increased to a value noticeably larger than is conventional. On the other hand, the diameter of the laser beam has a practical upper limit of 4.5 mm, a value that is about equal to that for a DVD.

In a case where the optical head 11 is placed at a position closer to the optical disc 12, the diameter of the laser beam is reduced commensurately with such closer position and, if the size of the optical system is in turn made smaller, the manufacturing accuracy and the layout accuracy of the objective lens 17 are improved commensurately with the smaller diameter of the laser beam and the smaller size of the optical system. However, problems may arise if the optical head 11 collides with the optical disc 12. For this reason, in the present embodiment, the working distance DW is set at about 560 microns in order to satisfy these conditions and alleviate the aforedescribed collision problem.

In addition, the first lens 17A is made to have a flat surface on the side of the optical disc 12 so as to allow focus control to be executed with a high degree of reliability. Moreover, a collision with the surface of the light transmission layer will not occur even if the optical disc 12 becomes skew (bent or warped).

Furthermore, the objective lens 17 has a noticeably reduced diameter on the side of the optical disc 12, that is, made with a surface on the side of the optical disc 12 having a diameter small enough for leading the laser beam to the optical disc 12.

The modulation coil 18 is located so as to surround the edge of the first lens 17A and to have its side surface on the side of the optical disc 12 oriented in a direction substantially parallel to the surface of the first lens 17A. In such a position, the modulation coil 18 is located at a position in as close a proximity to the optical disc 12 as is possible within a range that does not allow the modulation coil 18 to protrude from the surface of the first lens 17A. As a result, the modulation coil 18 is capable of applying an efficiently working modulating magnetic field to the radiation position of the laser beam.

The modulation coil 18 also surrounds the second lens 17B so that an increase in temperature is reduced by a heat dissipating plate 17E provided on the side of the second lens 17B. As a result, a variety of changes caused by the increase in temperature can be confined within a practically narrow range.

In the optical disc drive 10 shown in FIG. 6, the spindle motor 33 is controlled by a system control circuit 34 to drive the optical disc 12 into rotation so that a read/write clock signal R/W CK generated by a PLL circuit 35 has a constant frequency. That is to say, the spindle motor 33 drives the optical disc 12 into rotation by adopting the so-called ZCLV (Zone Constant Linear Velocity) technique. The zoning based on this ZCLV technique corresponds to the zoning explained earlier by referring to FIG. 3.

Controlled by the system control circuit 34, a thread motor 36 enables the optical head 11 to move in the radial direction of the optical disc 12, allowing a seek operation to be performed in the optical disc drive 10.

An address detecting circuit 37 receives the playback signal RF with the level thereof changing in accordance with the light quantity of a beam returning from the optical head 11, converting the playback signal RF into a binary signal. The address detecting circuit 37 further detects address data ID from the binary signal by using a synchronization signal allocated to a sector header as a reference, supplying the detected address data ID to the system control circuit 34. In addition, this detected timing is reported to a cluster counter 38. As a result, in the optical disc drive 10, the system control circuit 34 is capable of identifying the radiation position of the laser beam from the address data ID formatted in the optical disc 12 whereas the cluster counter 38 is capable of recognizing the sector timing.

When outputting this address ID, the address detecting circuit 37 further performs error detection processing by means of an error detection signal allocated to each address ID, selectively outputting only an address ID which is determined to not be erroneous.

A wobble signal detecting circuit 39 supplies the push-pull signal PP output by the optical head 11 to a band pass filter 39A employed therein for extracting the wobble signal WB. A comparison circuit 39B following the band pass filter 39A in the wobble signal detecting circuit 39 converts the wobble signal into a binary signal S1 by taking the 0 level as a reference in order to reveal edge information of the wobble signal WB.

Receiving the binary signal S1 from the comparison circuit 39B, a wobbling period detecting circuit 40 determines the timing of edges by taking the timing of edges of the binary signal S1 as a reference in order to determine whether the wobble signal WB varies at a correct period. The wobbling period detecting circuit 40 further selectively output pieces of edge information determined to be a correct period to the PLL circuit 35. In this way, the wobbling period detecting circuit 40 is capable of preventing a clock signal CK to be later described from being shifted by dust particles or other foreign materials adhered to the surfaces of the optical disc 12.

In the PLL circuit 35, the binary signal output by the wobbling period detecting circuit 40 is supplied to a phase comparing circuit (PC) 35A for comparing the phase of the binary signal with the phase of the clock signal CK generated by a frequency divider 35B. The frequency divider 35B outputs the clock signal CK by properly setting a frequency division ratio in accordance with a signal received from the system control circuit 34.

A low pass filter (LPF) 35C employed in the PLL circuit 35 extracts a low frequency component from a signal output by the phase comparing circuit 35A to represent the result of the phase comparison, outputting the low frequency component to a VCO (Voltage Controlled Oscillator) 35D. The low frequency component is used for controlling the oscillation frequency of the voltage controlled oscillator 35D. An oscillating signal output by the voltage controlled oscillator 35D is supplied to the frequency divider 35B for dividing the frequency of the oscillating signal. As a result, a highly accurate clock signal CK can be generated.

In the PLL circuit 35, the frequency divider 35B sequentially increases the frequency division ratio in accordance with a signal output by the system control circuit 34 as the radiation position of the laser beam is displaced toward an outer circumference of the optical disc 12 as part of the zoning previously described with reference to FIG. 3. As a result, the PLL circuit 35 sequentially increases the frequency of the oscillating signal generated by the voltage controlled oscillator 35D step-by-step as the frequency of the wobble signal WB increases accompanying the displacement of the radiation position of the laser beam toward an outer circumference of the optical disc 12. The oscillating signal is output by the PLL circuit 35 as the read/write clock signal R/W CK described earlier.

In the optical disc drive 10, the optical disc 12 is rotated by the spindle motor 33 such that the frequency of the read/write clock signal R/W CK remains constant. In addition, data is recorded into the optical disc 12 by using the read/write clock signal R/W CK as a reference. As a result, the difference of the line recording density between inner and outer circumferences is negligible, allowing the recording density to be increased commensurately with the uniformity of the line recording density over the entire circumference.

The cluster counter 38 counts the number of pulses in the read/write clock signal R/W CK by using the detection output by the address detecting circuit 37 as a reference. Thus, by using the read/write clock signal R/W CK as a reference, the radiation position of the laser beam can be identified with a high degree of accuracy. The cluster counter 38 further outputs a cluster start pulse based on a counting result to the system control circuit 34. As used herein, a cluster is defined as a unit for recording and playing back data into and from the optical disc 12. Additionally, the cluster start pulse is a pulse used for indicating the timing of the start of a pulse.

If the timing of the start of a sector cannot be detected by the address detecting circuit 37 due to dust particles or other foreign materials adhered to the surface of the optical disc 12, in this processing, the cluster counter 38 performs interpolation of a cluster start pulse by synchronization with the result of counting the number of pulses in the read/write clock signal R/W CK taken as a reference.

The system control circuit 34 is implemented mainly by a computer for controlling the overall operation of the optical disc drive 10. More particularly, the computer executes control of the operations of components such as the thread motor 36 based on pieces of address data ID sequentially supplied to the computer one piece after another. In addition, the computer switches the operating mode of the entire optical disc drive 10 from one mode to another. As a result, the system control circuit 34 is capable of controlling the whole operation in accordance with the radiation position of the laser beam and also in accordance with control commands received from external equipment.

In this series of operations, the system control circuit 34 varies the frequency division ratio of the frequency divider 35B in accordance with the radiation position of the laser beam which uses the address data ID as a reference. The values are determined by data of the frequency division ratio stored in a memory unit 42.

In this manner, the system control circuit 34 is capable of setting the recording densities of sectors in zones on the inner and outer circumferences at the same value by sequentially reducing the rotational speed of the optical disc 12 step-by-step as the radiation position of the laser beam is displaced from a zone on an inner circumference to a zone on an outer circumference among the zones Z0, Z1, - - - , Zn-1 and Zn described earlier with reference to FIG. 3.

In addition, by executing read/write control in accordance with a cluster start pulse output by the cluster counter 38 at that time, data of one cluster is allocated to four consecutive sectors with the address area AR2 set in each of the sectors taken as a reference. As a result, the system control circuit 34 sequentially increases the number of clusters allocated to each zone as the radiation position of the laser beam is displaced from a zone on an inner circumference to a zone on an outer circumference.

Furthermore, the system control circuit 34 issues a switching command to a tracking servo circuit {not shown) in order to request that the tracking servo circuit change the moving direction of the objective lens 17 depending on the polarity of a tracking error signal. As a result, the laser beam is switched from a groove to a land between two adjacent grooves or vice versa. That is, in the optical disc drive 10, the so-called land and groove recording operation can thus be performed.

Figure 9:
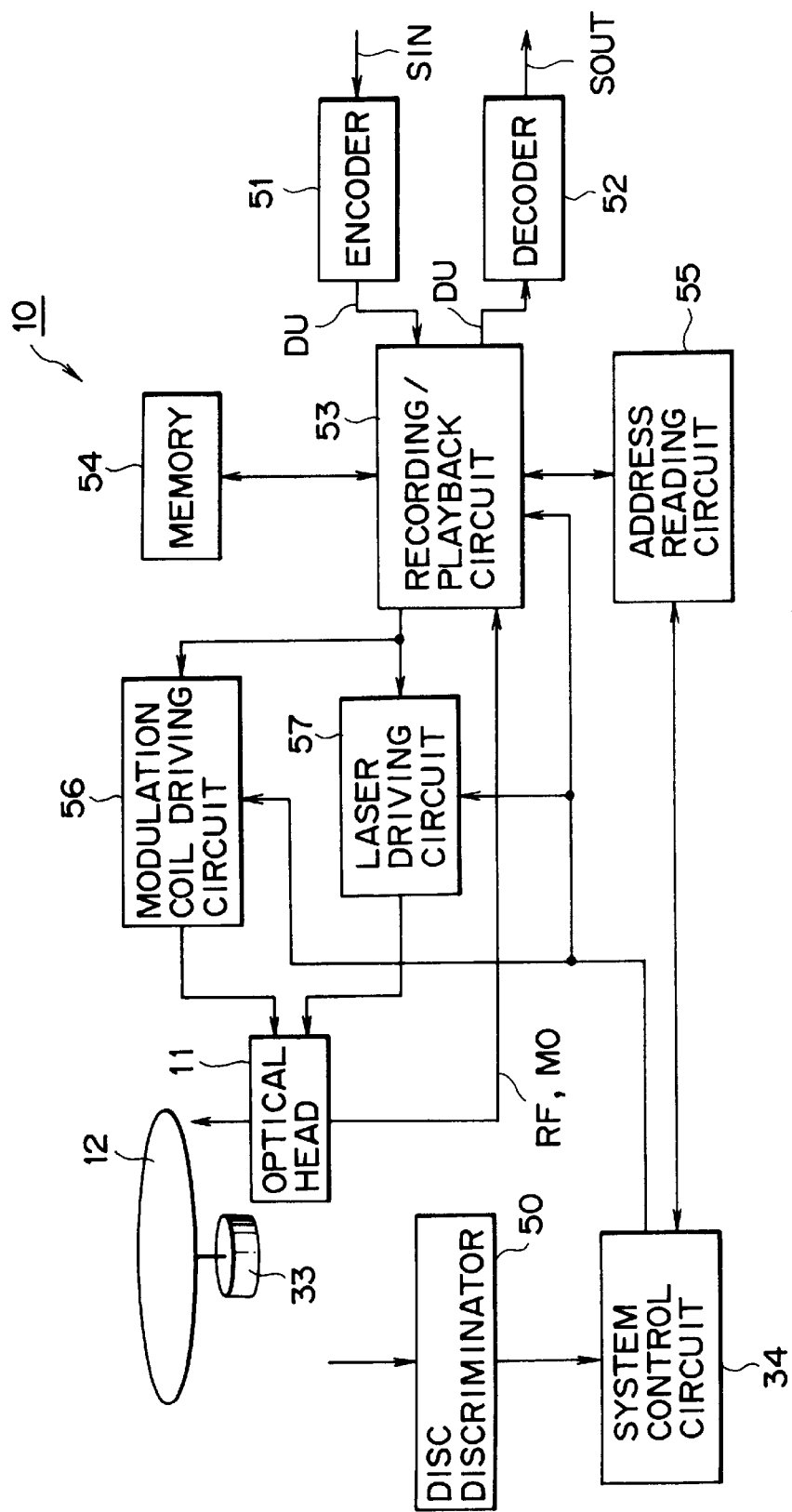
FIG. 9 is a block diagram showing a data processing system employed in the optical disc drive shown in FIG. 6.

FIG. 9 is a block diagram showing a recording/playback system of this optical disc drive 10. In this optical disc drive 10, a disk discriminator 50 identifies the type of the optical disc 12 from typically a dent 66 formed on the disc cartridge 60 of the optical disc 12. The disc discriminator 50 outputs an identification signal indicating the type of the optical disc 12 to the system control circuit 34. As a result, the optical disc apparatus 10 is capable of making an access to a variety of optical discs 12 by switching the operation of the recording/playback system from one state to another in accordance with the type of the optical disc 12 mounted on the optical disc drive 10.

In a recording operation or during editing work, an encoder 51 receives an input signal SIN comprising video and audio signals from external equipment. The analog video and audio signals are converted into a digital signal which is then compressed according to a format prescribed by the MPEG (Moving Picture Experts Groove). The compressed digital signal is finally output as user data DU.

On the contrary, a decoder 52 performs processing opposite to that performed by the encoder 51, decompressing user data DU output by a recording/playback circuit 53 to be described below according to a format prescribed by the MPEG to generate a digital video signal and a digital audio signal which are then converted into an output analog signal SOUT.

In a recording operation or editing work, the recording/playback circuit 53 stores the user data DU output by the encoder 51 in a memory unit 54 and, at the same time, processes the data DU in predetermined block units which are finally recorded into the optical disc 12.

Figure 10:
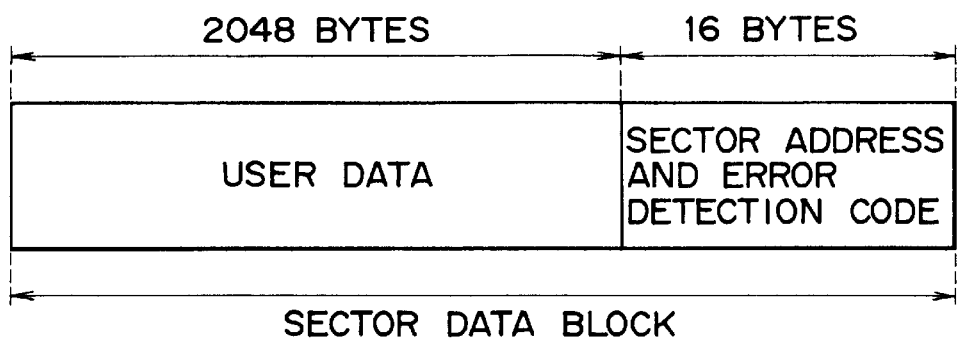
FIG. 10 is a diagram used for explaining the structure of a sector handled by the data processing system of the optical disc drive shown in FIG. 9.

In particular, the recording/playback circuit 53 divides the user data DU into a series of block units each having a length of 2,048 bytes as shown in FIG. 10. As shown in the figure, address data and an error detection code of a total of 16 bytes are added to each block. The recording/playback circuit 53 forms a sector data block comprising the 2,048-byte block unit and the address data and the error detection code with a total length of 16 bytes. The address data is an address at which the sector data block is to be recorded. A sector occupied by the user data DU is different from the sector preformatted as described earlier with reference to FIG. 3. The error detection code is a code used for detecting an error in the address data, if any.

Figure 11:
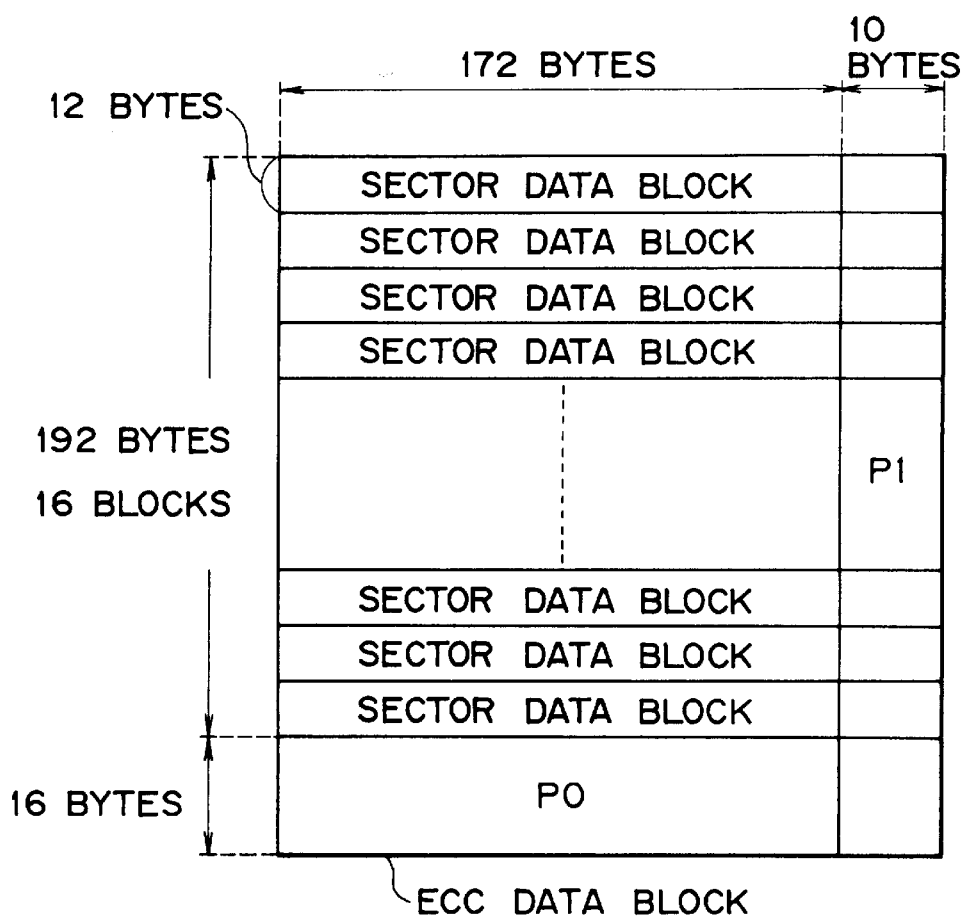
FIG. 11 is a diagram showing an ECC block handled by the data processing system of the optical disc drive shown in FIG. 9.

The recording/playback circuit 53 further forms an ECC data block of 182 bytes×208 bytes shown in FIG. 11 by using 16 sector data blocks. More specifically, the recording/playback circuit 53 arranges 16 sector data blocks comprising 2,048 bytes per sector data block×16 sector data blocks into an array of 16 blocks each having a size of 12 bytes×172 bytes in a raster scanning order. In the horizontal direction of the array, internal codes are generated as error correction codes (PI) while, in the vertical direction of the array, external codes are generated as error correction codes (PO) to result in the ECC data block.

The recording/playback circuit 53 performs interleave processing on the ECC data block to form a frame structure shown in FIG. 12. In particular, the recording/playback circuit 53 assigns a 2-byte frame synchronization signal (FS) to every 91 bytes of the (182 bytes×208 bytes) ECC data block, producing 208 frames out of the ECC data block. A frame structure comprising 208 frames is referred to as a data cluster which is recorded in 4 consecutive sectors.

At that time, the recording/playback circuit 53 assigns data with a predetermined fixed value if necessary, processing consecutive pieces of data according to the sector structure explained earlier with reference to FIG. 4. In addition, the recording/playback circuit 53 performs (1, 7) RLL modulation on the series of data pieces arranged into such a matrix before performing processing between consecutive bits to produce an output. When producing the output, the output is converted into user data DU to be output at a data transfer speed of 11.08 Mbps. Since the user data DU is output at a data transfer speed higher than a data transfer speed at which the user data DU is input from the encoder 51, the recording/playback circuit 53 has to output the user data DU intermittently. Thus, the recording/playback circuit 53 also records the user data DU into the optical disc 12 intermittently, allowing a gap between two consecutive intermittent pieces of user data DU to be used for performing a seek operation. Even in the event of a mistracking caused by vibration or the like, consecutive pieces of user data DU can be recorded into a contiguous area.

In an operation to record user data, the recording/playback circuit 53 outputs data modulated by using the read/write clock signal R/W CK described earlier with reference to FIG. 6 as a reference. The circuit 53 starts the operation to output the modulated data by using timing detected by the cluster counter 38 as a reference in accordance with control executed by the system control circuit 34.

In a playback operation, the recording/playback circuit 53 amplifies the playback signals RF and MO generated by the optical head 11 and then converts the amplified signals into binary signals. A clock signal is further generated from the playback signals RF and MO by using the binary signals as a reference. Moreover, the clock signal corresponds to the read/write clock signal R/W CK. Furthermore, by sequentially latching the binary signals with the clock signal used as a reference, playback data can be detected.

At that time, the recording/playback circuit 53 decodes (demodulates) the playback data by applying a PRML (Partial-Response Maximum Likelihood) technique and generates decoded (demodulated) data. Then, the recording/playback circuit 53 performs de-interleave processing and error correction processing on the decoded (demodulated) data before supplying the data to the decoder 52.

In the case of a DVD, data completing the (1, 7) RLL modulation is recorded at a shortest pit length of 0.4 microns. In a recording/playback system designed at the same margin as a DVD by simple transformation based on the numerical aperture, data can be recorded and played back at a shortest pit length of 0.3 microns and a line recording density of 0.23 microns/bit. However, by deliberately utilizing intercede interference through adoption of the PRML technique, the same margin can be assured at a line recording density equal to or smaller than 0.23 microns/bit.

Similar to the recording operation, in the playback operation, the recording/playback circuit 53 plays back data from the optical disc 12 intermittently in cluster units at a data transfer speed of 11.08 Mbps and transforms the playback data into user data DU which is then continuously supplied to the decoder 52.

In processing performed during the series of playback operations, the recording/playback circuit 53 is controlled by the system control circuit 34 to selectively process the playback signal MO with the level thereof changing in accordance with the plane of polarization of a returned light. The circuit 53 plays back user data DU where the optical disc 12 is a photo-magnetic disc. In a case where the optical disc 12 is an optical disc for playback purposes only, a postscript type optical disc or a variable phase optical disc, the recording/playback circuit 53 selectively processes the playback signal RF with the level thereof changing in accordance with variations in light quantity of a returned light and thereby reproduces user data DU. Even in a case where the optical disc 12 is a photo-magnetic disc, in an operation to play back read-in area on an inner circumference, the recording/playback circuit 53 selectively processes the playback signal RF and plays back user data DU.

In a recording operation, an address reading circuit 55 plays back address data added to each sector block as shown in FIG. 10 and outputs the address data to the recording/playback circuit 53. In a playback operation, on the other hand, the address reading circuit 55 analyzes address data detected by the recording/playback circuit 53, informing the system control circuit 34 of the results of the analysis.

In a case where the optical disc 12 is a photo-magnetic disc, in a recording operation, a laser driving circuit 57 is controlled by the system control circuit 34 to drive the semiconductor laser employed in the optical head 11 with timing synchronized to the read/write clock signal R/W CK. Hence, intermittently raising the light quantity of the laser beam is intermittently raised.

In a case where the optical disc 12 is a variable phase disc or a postscript type disc, in a recording operation, the laser driving circuit 57 is controlled by the system control circuit 34 to intermittently raise the light quantity of the laser beam by using data output by the recording/playback circuit 53, and thereby records user data DU into the optical disc 12.

In a playback operation, however, the laser driving circuit 57 holds the light quantity of the laser beam at a fixed relatively low level.

In a case where the optical disc 12 is a photo-magnetic disc, a modulation coil driving circuit 56 is controlled by the system control circuit 34 to enhance a recording operation and to drive the modulation coil 18 employed in the optical head 11 in accordance with data output by the recording/playback circuit 53. In this way, the modulation coil driving circuit 56 applies a modulating magnetic field to the radiation position of the laser beam, the light quantity of which is raised intermittently, and records the user data DU by adopting a thermal magnetic recording technique.

Figure 1:
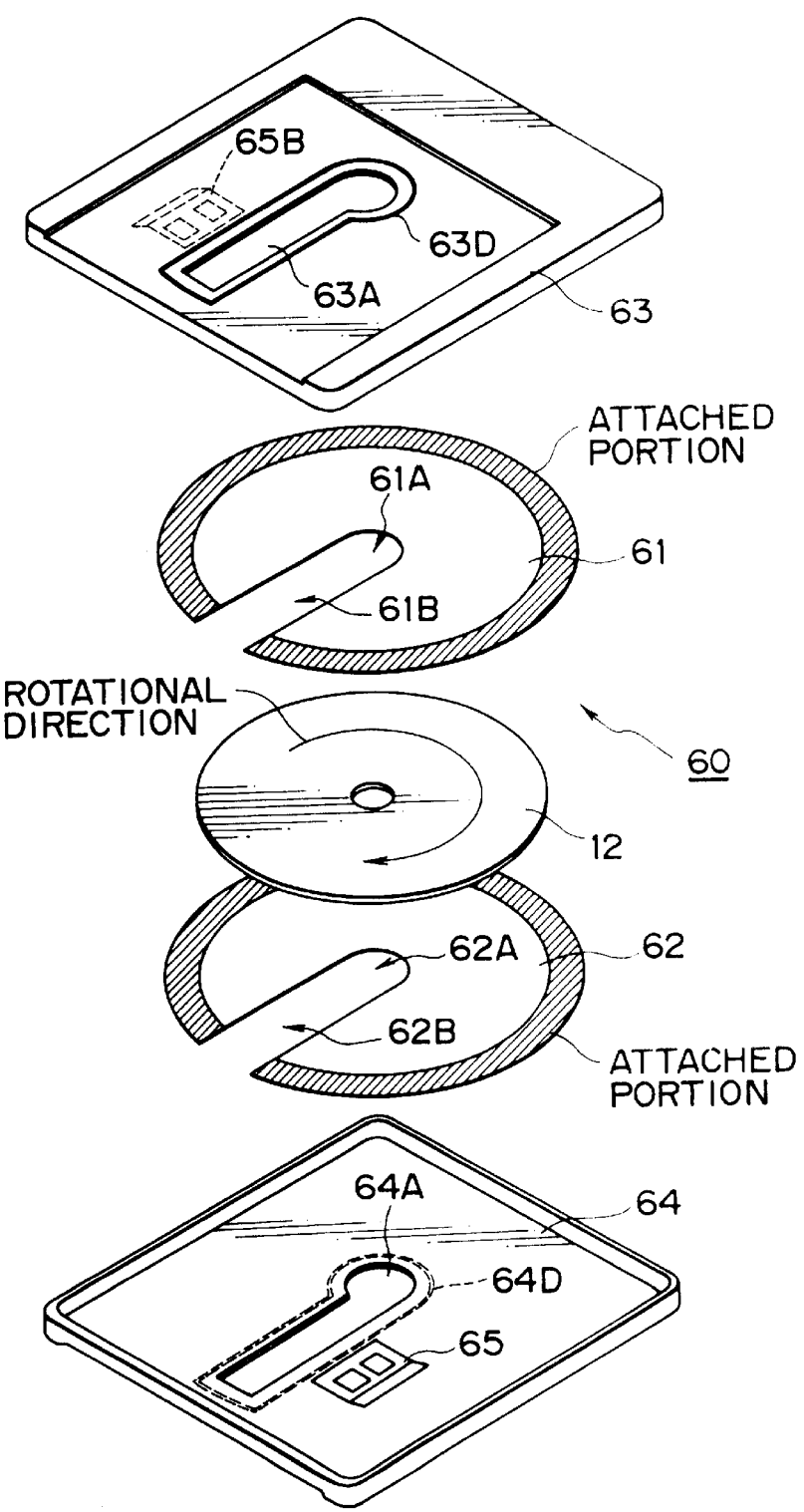
FIG. 1 is an exploded view of a preferred embodiment of a disassembled disc cartridge used for accommodating and retaining an optical disc without a shutter in accordance with the teachings of the present invention.

FIG. 1 is a diagram showing an exploded perspective view of a disassembled disc cartridge 60 for accommodating and retaining the optical disc 12. In the present embodiment, the optical disc 12 is accommodated and retained in the disc cartridge 60 in such a way that it is difficult to remove the disc 12 from the cartridge 60. With the optical disc 12 accommodated and retained in the disc cartridge 60, the cartridge 60 is mounted on the optical disc drive 10. It should be noted that FIG. 1 shows the disassembled disc cartridge 60 with a shutter thereof removed.

More particularly, the optical disc 12 is accommodated in the disc cartridge 60 and retained between an upper case 63 and a lower case 64 with sheet materials 61 and 62, respectively, laid on the two surfaces of the optical disc 12. The sheet materials 61 and 62 are each a piece of cloth formed into a shape substantially resembling a circular plate. The cloth is made of a woven material having slightly rough surfaces. When the optical disc 12 is rotated in the disc cartridge 60, dust particles or other foreign material adhered to the surfaces of the optical disc 12 are absorbed by the sheet materials 61 and 62. As a result, the surfaces of the optical disc 12 are cleaned by the sheet materials 61 and 62.

In addition, the sheet materials 61 and 62 are each made having a diameter greater than that of the optical disc 12 so that the optical disc 12 can be enclosed by the sheet materials 61 and 62. The edge on the outermost circumference of the sheet material 61 is attached to the edge on the outermost circumference of the sheet material 62 by an adhesive agent shown as a hatched area in the figure to form an envelop enclosing the optical disc 12. Therefore, the sheet materials 61 and 62 protect the optical disc 12 against dust particles or other foreign materials intruding into disc cartridge 60, thereby preventing the dust particles or other foreign materials from being adhered to the surfaces of the optical disc 12.

A cut which starts from an area around the center of rotation of the optical disc 12 and is extended to the outermost circumference of the optical disc 12 is further provided on each of the sheet materials 61 and 62. Cut portions 61A and 62A of the cuts in the areas of the sheet materials 61 and 62 respectively around the center of rotation of the optical disc 12 allow the optical disc drive 10 to chuck the optical disc 12. On the other hands, cut portions 61B and 62B of the cuts in the areas of the sheet materials 61 and 62 respectively extended from the center of rotation to the outermost circumference of the optical disc 12 allow the optical heads 11 to access the surfaces of the optical disc 12.

Figure 13:
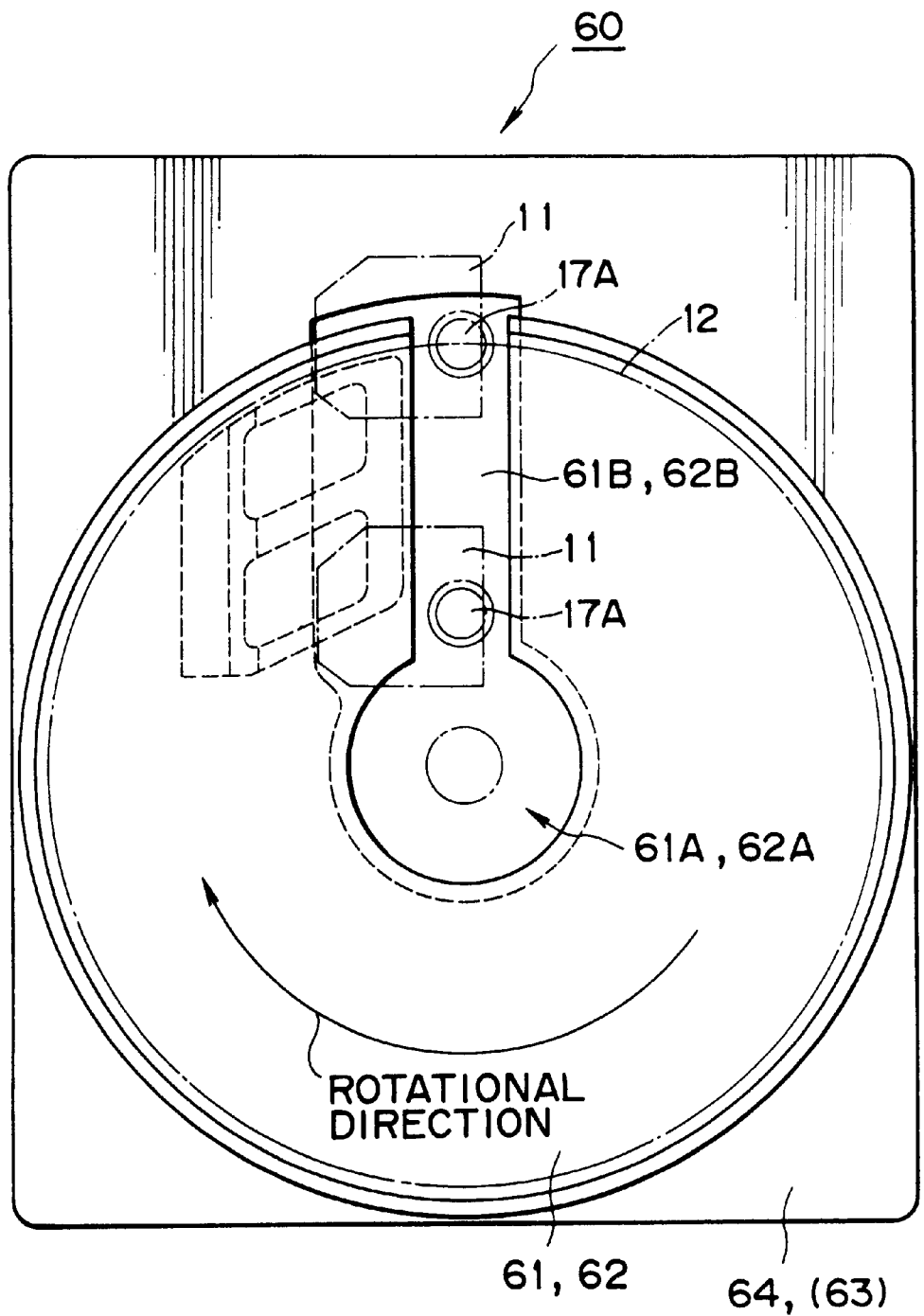
FIG. 13 is an elevational view specifically showing the relationship between an opening and a sheet-shaped member in the disc cartridge shown in FIG. 1.

As shown in FIG. 13, the cut portions 61A and 62A in the areas around the center of rotation each have a minimum size required by the optical disc drive 10 to chuck the optical disc 12. By the same token, the cut portions 61B and 62B extended from the areas around the center of rotation to the outermost circumference are each have a minimum size required by the optical heads 11 to access the surfaces of the optical disc 12. More precisely, in the present embodiment, the optical disc drive 10 accesses the surfaces of the optical disc 12 at a small working distance. As a result, the optical head 11 can be designed into such a shape that components forming the optical head 11, such as the first lens 17A and the modulation coil 18, are never brought into contact with the surface of the optical disc 12 even if the optical head 11 performs a seek operation.

In this way, the sheet materials 61 and 62 cover the two surfaces of the optical disc 12 respectively except areas around the center of rotation and a range that would otherwise obstruct the incident laser beam if closed in such an arrangement that the surfaces of the optical disc 12 are externally concealed as much as possible. In the case of a single-sided optical disc 12 that has an information recording surface on only one side, either only the cut portion 61A or the cut portion 62A needs to be provided in the area around the center of rotation of the optical disc 12 on the sheet material 61 or 62 respectively.

The upper case 63 and the lower case 64 are each made of resin by injection molding. On the upper case 63, an opening 63A is cut extending over an area around the center of rotation of the optical disc 12 and an area extended from the center of rotation to the outermost circumference of the optical disc 12. This opening 63A, faces the cut portions 61A and 61B provided on the sheet material 61. Similarly, on the lower case 64, an opening 64A is cut extending over an area around the center of rotation of the optical disc 12 and an area extended from the center of rotation to the outermost circumference of the optical disc 12. This opening 64A of the lower case 64 faces the cut portions 62A and 62B provided on the sheet material 62.

Similar to the cut portions 61A and 62A on the sheet materials 61 and 62 respectively, the portions of the openings 63A and 64A facing the area around the center of rotation of the optical disc 12 are used by the optical disc drive 10 to chuck the optical disc 12. Conversely, the portions of the openings 63A and 64A facing the area extending from the center of rotation to the outermost circumference of the optical disc 12 are used for allowing the optical heads 11 to approach the surfaces of the optical disc 12.

For this reason, the portions of the openings 63A and 64A facing the area extending from the center of rotation to the outermost circumference of the optical disc 12 have sizes greater than the cut portions 61B and 62B on the sheet materials 61 and 62 respectively. For a single-sided optical disc 12 having an information recording surface on only one side, only either the portion of the opening 63A or 64A is required around the center of rotation of the optical disc 12 on the upper case 63 or the lower case 64 respectively.

In addition, at a location in close proximity to the opening 64A on the surface of the lower case 64 facing the information recording surface of the optical disc 12, a pressing member 65 is provided as shown in FIG. 1. The pressing member 65 is used to press the sheet material 62 upwardly, causing the sheet material 62 to be pressed against the lower surface of the optical disc 12. The pressing member 65 is made by bending a metallic plate to form a shape functioning as a spring. As a result, the cleaning effect of the surface of the optical disc 12 provided by the sheet material 62 is increased. In the case of a double-sided optical disc 12 having information recording surface on each side, a pressing member 65B is provided at a location in close proximity to the opening 63A on the surface of the upper case 63 facing the information recording surface of the optical disc 12 as the pressing member 65 is provided on the lower case 64 as shown in FIG. 1. Instead, the pressing member 65B is used to press the sheet material 61 downwardly causing the sheet material 61 to be pressed against the upper surface of the optical disc 12. Similar to the pressing member 65, the pressing member 65B is made by bending a metallic plate to form a shape functioning as a spring. As a result, the cleaning effect of the surface of the optical disc 12 provided by the sheet material 61 is increased.

Figure 14:
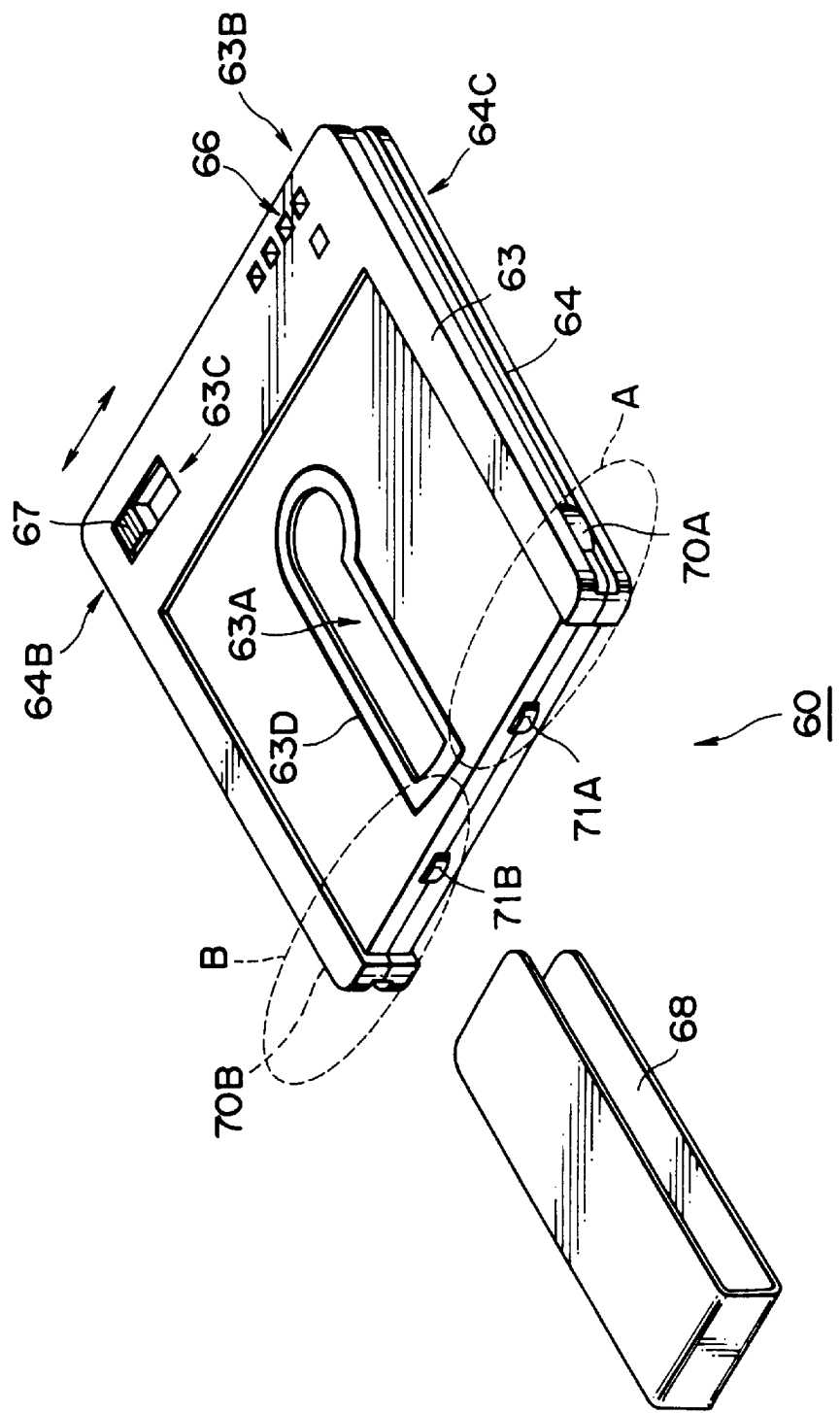
FIG. 14 is a perspective view showing the relationship between a shutter and other components in the disc cartridge shown in FIG. 1.

As shown in FIG. 14, an edge of the upper case 63 located generally perpendicular to opening 63A and located on a side farthest from the opening 63A includes an identification area 63B of the optical disc 12. Moreover, an edge of the lower case 64 located generally perpendicular to the opening 64A and located on a side farthest from the opening 64A also includes an identification area 64B of the optical disc 12. A dent 66 having a rectangular shape depending on the type of the information recording surface of the optical disc 12 accommodated in the disc cartridge 60 is provided on each of the identification areas 63B and 64B on the edges of the upper and lower cases 63 and 64 respectively. The dents 66 each allow the type of the information recording surface of the optical disc 12 accommodated in the disc cartridge 60 to be easily identified with a high degree of reliability. In the case of a double-sided optical disc 12 accommodated in the disc cartridge 60 with an information recording surface on each side, the identification areas 63B and 64B are provided on the upper and lower cases 63 and 64 respectively as described above. In the case of a single-sided optical disc 12 accommodated in the disc cartridge 60 with an information recording surface on only one side thereof, only either the identification area 63B or 64B needs to be provided on the upper and lower case 63 or 64 respectively.

An access restriction setting area 63C in the remaining area on the same edge as the identification area 63B on the upper case 63 is further used for placing an upper-side slide switch 67. Further, an access restriction setting area 64C in the remaining area on the same edge as the identification area 64B on the lower case 64 is also used for placing a lower-side slide switch 67. Each of the slide switches 67 can be slid in directions indicated by the arrows in FIG. 14 to open and close a through hole bored on each of the access restriction setting areas 63C and 64C. As a result, with this disc cartridge 60, a write inhibit state can be established for each of the information recording surfaces of the optical disc 12 by properly setting the slide switches 67. In the case of a single-sided optical disc 12 accommodated in the disc cartridge 60 with an information recording surface on only one side, only either the access restriction setting area 63C or 64C is required on the upper case 63 or the lower case 64 respectively.

With the optical disc 12 accommodated and retained between the upper case 63 and the lower case 64, the disc cartridge 60 is further provided with a shutter 68 which is bending a metallic plate or made of resin by injection molding to obtain a cross-sectional generally U-shape. The shutter 68 is provided on the disc cartridge 60 closing the opening 63A on the upper case 63 and the opening 64A on the lower case 64. When the disc cartridge 60 is mounted on the optical disc drive 10, the shutter 68 is slid by a loading mechanism of the optical disc drive 10 to be later described to expose the openings 63A and 64A to the optical heads 11.

Figure 15:
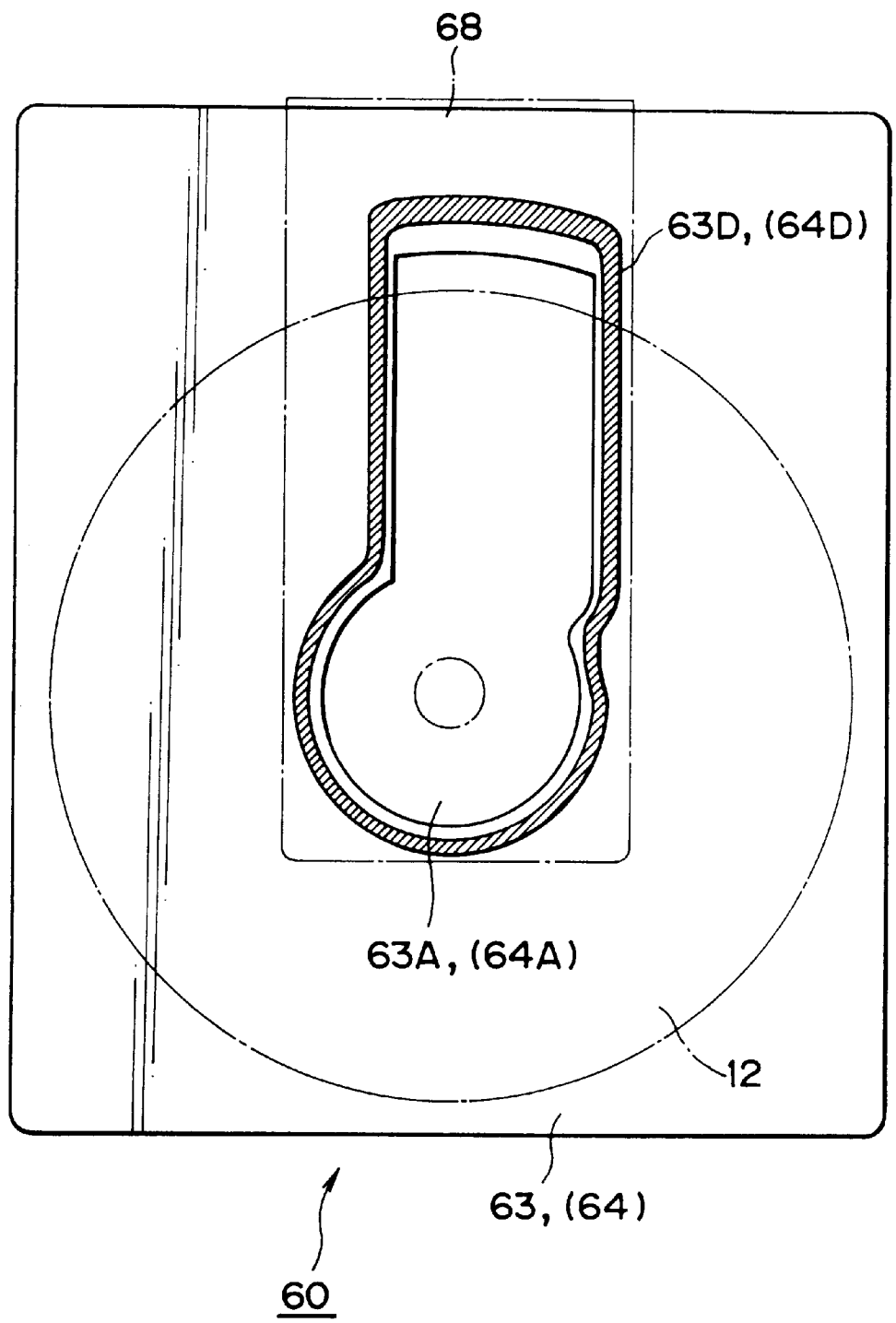
FIG. 15 is an elevational view showing the relationship among the shutter, the opening and a shock relieving or sealing member in the disc cartridge shown in FIG. 1.

The upper case 63 is provided with a shock relieving or sealing member 63D surrounding the opening 63A and the lower case 64 is provided with a sealing member 64D surrounding the opening 64A. The sealing members 63D and 64D are each made of a flexible sheet material, typically a felt sheet material or rubber-like material which is elastic in nature, as shown in FIG. 15. The felt sheet material is punched out into a shape to surround the opening 63A on the upper case 63 and to be adhered to the surface of the upper case 63. In addition, another felt sheet material is punched out into a shape to surround the opening 64A on the lower case 64 and to be adhered to the surface of the lower case 64. As a result, with the opening 63A on the upper case 63 covered by the shutter 68, a gap between the shutter 68 and the upper case 63 in the disc cartridge 60 is closed the sealing member 63D which prevents dust particles and other foreign materials from intruding onto the surfaces of the optical disc 12. Similarly, with the opening 64A on the lower case 64 covered by the shutter 68, a gap between the shutter 68 and the lower case 64 in the disc cartridge 60 is blocked by the sealing member 64D which prevents dust particles and other foreign materials from intruding onto the surfaces of the optical disc 12.

In addition, the upper and lower cases 63 and 64 share two movement restricting mechanisms denoted by dashed line circles A and B shown in FIG. 14. The movement restricting mechanisms are used for restricting the sliding movement of the shutter 68 over the upper and lower cases 63 and 64 and the sliding movement of the disc cartridge 60 along grooves created on a mounting chamber of the optical disc drive 10 on two sides of the disc cartridge 60. As shown in the figure, the movement restricting mechanisms are provided on the edge of the disc cartridge 60 generally perpendicular to the orientation of the openings 63A and 64A and located on the side closest to the openings 63A and 64A. One of the movement restricting mechanism denoted by the dashed line circle A is formed of a button 70A located on one side of the disc cartridge 60 and is used for preventing removal of the disc cartridge 60 from the groove provided on this side, and a button 71A located on the edge of the disc cartridge 60 on one side of the shutter 68 which is used for securing the shutter 68 when the shutter 68 covers the openings 63A and 64A. Similarly, the other movement restricting mechanism denoted by the dashed line circle B is formed of a button 70B located on the other side of the disc cartridge 60 and is used for preventing removal of the disc cartridge 60 from the groove created on this side, and a button 71B located on the edge of the disc cartridge 60 on the other side of the shutter 68 which is used for securing the shutter 68 when the shutter 68 covers the openings 63A and 64A.

Figure 16:
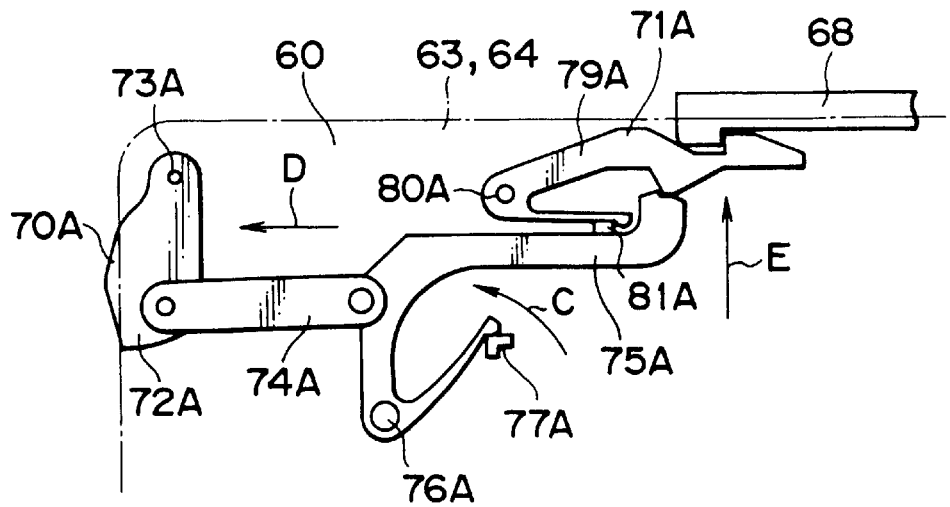
FIG. 16 is an elevational view used for explaining a movement restricting mechanism provided in the disc cartridge shown in FIG. 1.

FIG. 16 is a plan view showing the movement restricting mechanism denoted by the dashed line circle A in FIG. 14. As shown in FIG. 16, in this movement restricting mechanism, the button 70A is a protrusion of a rotating member 72A which extends outwardly of the side surface of the disc cartridge 60. The rotating member 72A is made of resin by injection molding and is supported by a rotational shaft 73A positioned at a corner of the disc cartridge 60 so that the rotating member can be rotated freely around the rotational center of the rotational shaft 73A. The rest of the rotating member 72A is a root portion of the button 70A with a size greater than the button 70A. The root portion is linked to a first stopper 75A by a link member 74A so that only the button 70A protrudes outwardly of the side surface of the disc cartridge 60 through a window provided in the side surface with the root portion concealed inside the disc cartridge 60.

The first stopper 75A is made of resin by injection molding and is supported by a rotational shaft 76A so that the first stopper 75A can be rotated freely around the rotational center of the rotational shaft 76A. The first stopper 75A has a shape with two arm members extending from a portion in close proximity to the rotational shaft 76A. The end of one of the arm members is engaged by a protrusion 77A created either on the upper case 63 or on the lower case 64. An elastic force generated by the protrusion 77A and the arm member engaged by the protrusion 77A attempts to rotate the first stopper 75A in a direction indicated by an arrow C toward the button 70A (see FIG. 16). The other arm member of the first stopper 75A is connected to the rotating member 72A by the link member 74A. In this manner, the first stopper 75A presses the rotating member 72A in a direction indicated by an arrow D so that the button 70A protrudes outwardly of the side surface of the disc cartridge 60 through the window. As the root portion of the button 70A comes into contact with the window, the rotating member 72A stops the rotation of the first stopper 75A.

The other arm member of the first stopper 75A is bent at the joint with the link member 74A to form an angle of curvature of about 90 degrees and is extended in a direction parallel to the edge of the disc cartridge 60 toward the shutter 68. The extended portion of the arm is further bent at a location in close proximity to one end of the shutter 68 in a direction toward the shutter 68. The end of the extended portion of this arm member of the first stopper 75A is bent in close proximity to one end of the shutter 68 to control movement of a second stopper 79A.

Similar to the first stopper 75A, the second stopper 79A is made of resin by injection molding. The second stopper 79A is supported by a predetermined rotational shaft 80A so that the second stopper 79A can be rotated freely around the rotational center of the rotational shaft 80A. The second stopper 79A includes two arm members both extending from a location in close proximity to the rotational shaft 80A. One of the arms includes button 71A. The end of the other arm of the second stopper 79A is engaged by a protrusion 81A which can be provided either on the upper case 63 or the lower case 64, protruding outwardly of the surface of the upper or lower case 63 or 64 on the back side of the bent arm of the first stopper 75A. An elastic force generated by the arm member of the second stopper 79A, the end of which is engaged by the protrusion 81A, rotates the entire second stopper 79A in a direction shown by an arrow E (see FIG. 17) toward the side of the button 71A.

The arm member of the second stopper 79A including the button 71A is extended so that the end of the arm approaches the root portion of the shutter 68. The end of this arm member is placed in an engaged state with a protrusion at the root of the shutter 68. With the end of this arm placed in an engaged state with the protrusion at the root of the shutter 68, the back portion of this arm member is brought into contact with the end of the bent arm of the first stopper 75A.

In this state, the button 71A on the second stopper 79A is displaced to the inside of the disc cartridge 60 and the movement of the second stopper 79A is controlled by the first stopper 75A so that the engaged state of the end of the arm member of the second stopper 79A with the protrusion at the root of the shutter 68 is sustained.

In this state, the movement restricting mechanism provided on the disc cartridge 60 effectively prevents the shutter 68 from being slid inadvertently by an incorrect operation performed by the user. Accordingly, dust particles and other foreign materials are prevented from intruding onto the case of the disc cartridge 60 due an exposed state of the openings 63A and 64A which results from the inadvertent sliding of the shutter 68.

Figure 17:
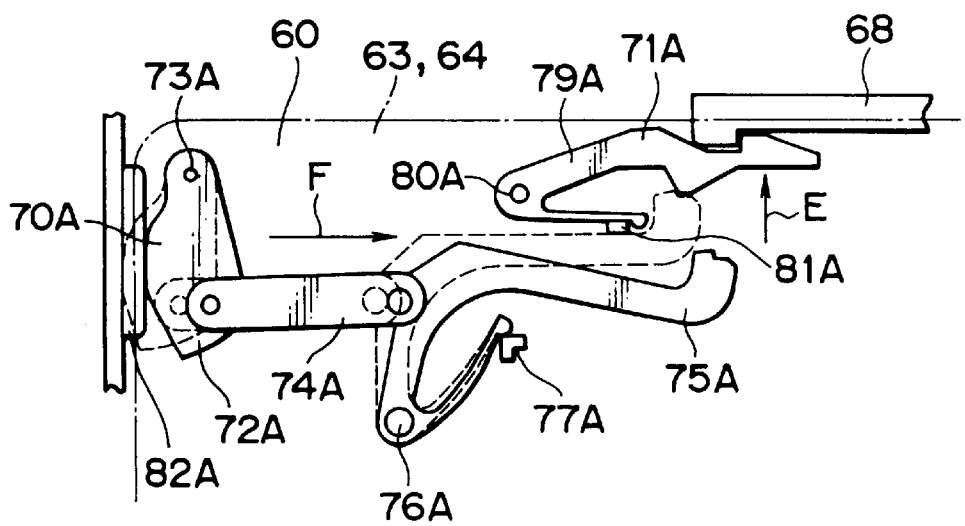
FIG. 17 is an elevational view used by comparison with FIG. 16 specifically illustrating button 70A in a depressed condition.

Moreover, when the button 70A of the movement restricting mechanism protruding outwardly of the side surface of the disc cartridge 60 through the window is pressed toward the inside of the disc cartridge 60 by a predetermined pressing member 82A, as shown in FIG. 17, the rotating member 72A rotates, causing the first stopper 75A to rotate through the link member 74A which moves in a direction indicated by an arrow F. As a result, the end of the bent arm of the first stopper 75A moves away from the rear of the second stopper 79A, resulting in displacement of the button 71A provided on the second stopper 79A.

Figure 18:
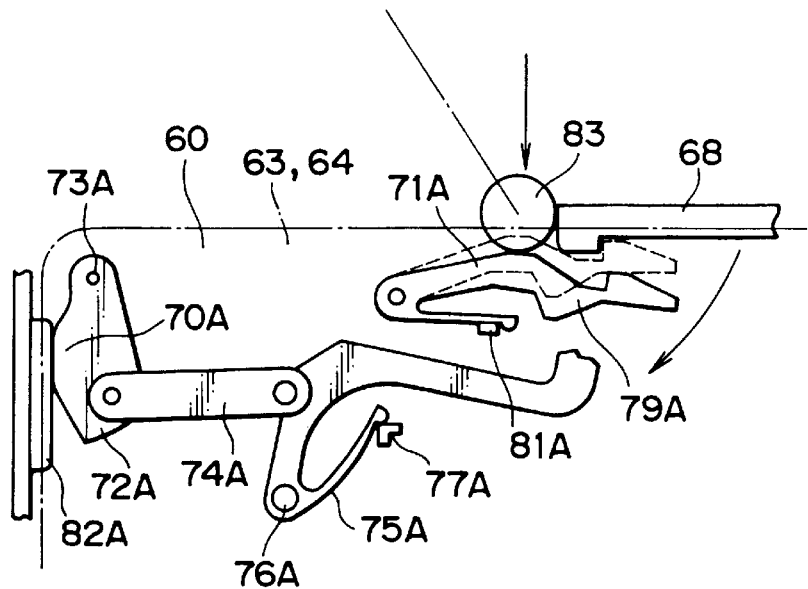
FIG. 18 is an elevational view used by comparison with FIG. 17 specifically illustrating another button 71A in a depressed condition.
Figure 19:
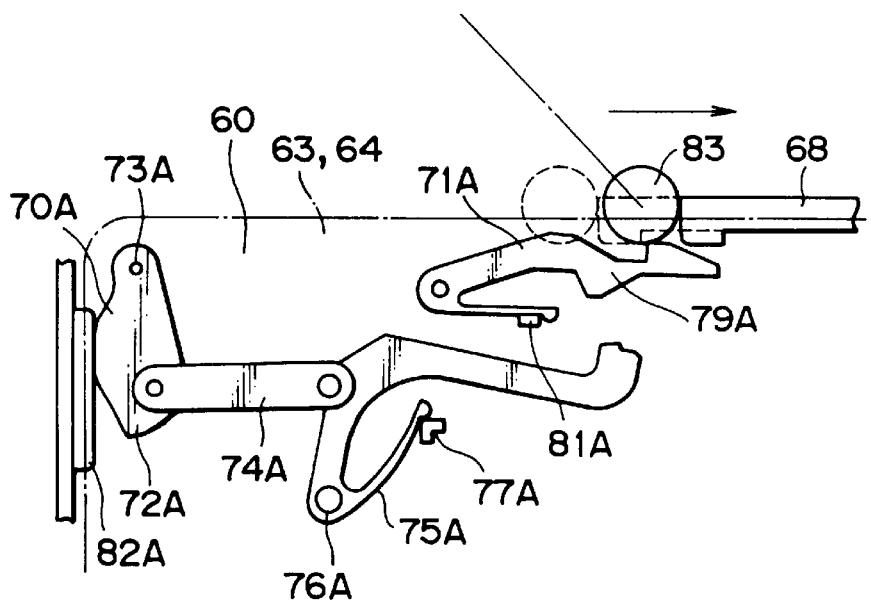
FIG. 19 is an elevational view used for comparison with FIG. 18 specifically illustrating the shutter in a slid aside condition.

If the button 71A provided on the second stopper 79A is pressed toward the inside of the disc cartridge 60 as shown in FIG. 18, the end of the arm of the second arm 79A is no longer engaged with the protrusion at the root of the shutter 68. As a result, the shutter 68 can be slid toward the other movement restricting mechanism as shown in FIG. 19 provided the other movement restricting mechanism is not preventing or restricting movement of the shutter 68. In this way, the movement restricting mechanism employed in the disc cartridge 60 is designed so that the shutter 68 is slid only after the buttons 70A and 71A have been pressed sequentially one after another if the other movement restricting mechanism is not preventing or restricting movement of the shutter 68. As a result, the movement restricting mechanism provided on the disc cartridge 60 effectively prevents an exposed state of the openings 63A and 64A due to a user's inadvertent sliding of the shutter 68.

Figure 20:
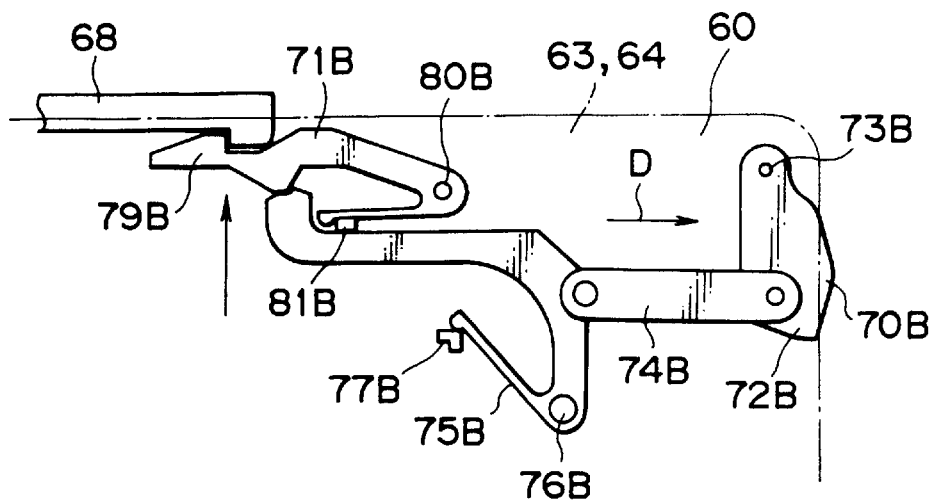
FIG. 20 is an elevational view used for explaining another movement restricting mechanism provided in the disc cartridge of FIG. 1.
Figure 21:
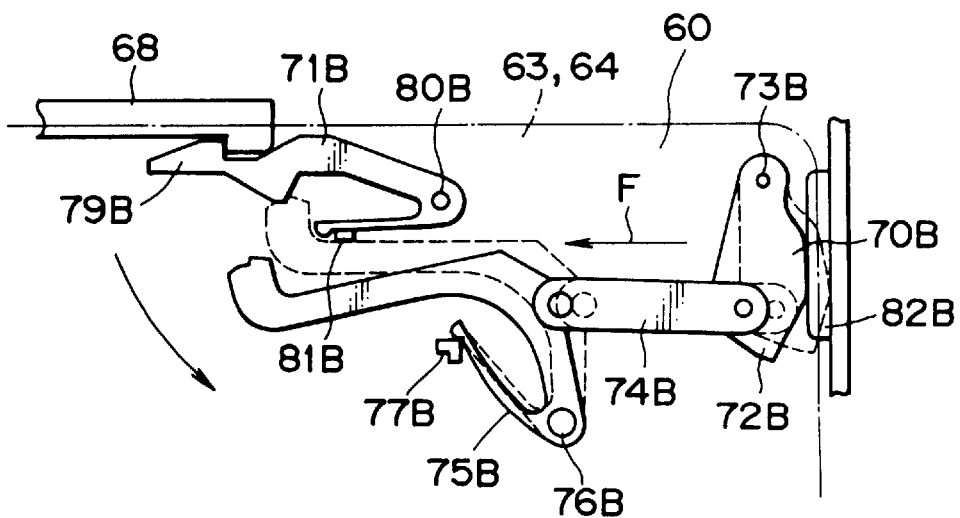
FIG. 21 is an elevational view used for comparison with FIG. 20 specifically illustrating button 70B in a depressed condition.
Figure 22:
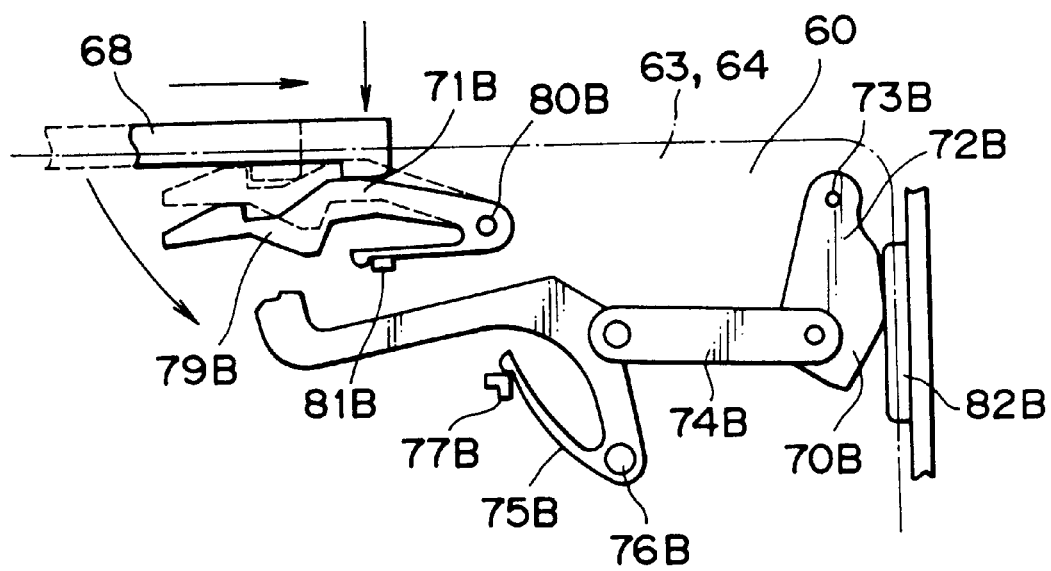
FIG. 22 is an elevational view used for comparison with FIG. 21 specifically illustrating the shutter in a slid aside condition.

FIGS. 20 to 22 are each a plane diagram showing the other movement preventing mechanism. Components of the other movement restricting mechanism identical with those employed in the movement restricting mechanism described with reference to FIGS. 16 to 19 are denoted by the same reference numerals as the latter except that their subscripts are changed from 'A' to 'E'. The other movement restricting mechanism is built symmetrically with the movement restricting mechanism described with reference to FIGS. 16 to 19. With this configuration, even in the case of the so-called double side optical disc 12, the disc cartridge 60 can be mounted upside down on the optical disc drive 10 in a way as simple as the disc cartridge 60 of a single-sided optical disc 12 is mounted. As for the optical disc drive 10 itself, both a single-sided optical disc and a double-sided optical disc can be loaded by using a common loading mechanism employed in the optical disc drive 10.

The operation of the other movement restricting mechanism is the same as the movement restricting mechanism shown in FIGS. 16 to 19 until the restrictions on the movement of the second stopper 79B are removed by pressing the button 70B provided on the other side surface of the disc cartridge 60. In a subsequent operation, the shutter 68 presses the button 71B to permit the shutter 68 to slide as shown in FIG. 22.

As a result, in the disc cartridge 60, a threefold safety mechanism effectively prevents an exposed state of the openings 63A and 64A due to the user's inadvertent sliding of the shutter 68.

Figure 23:
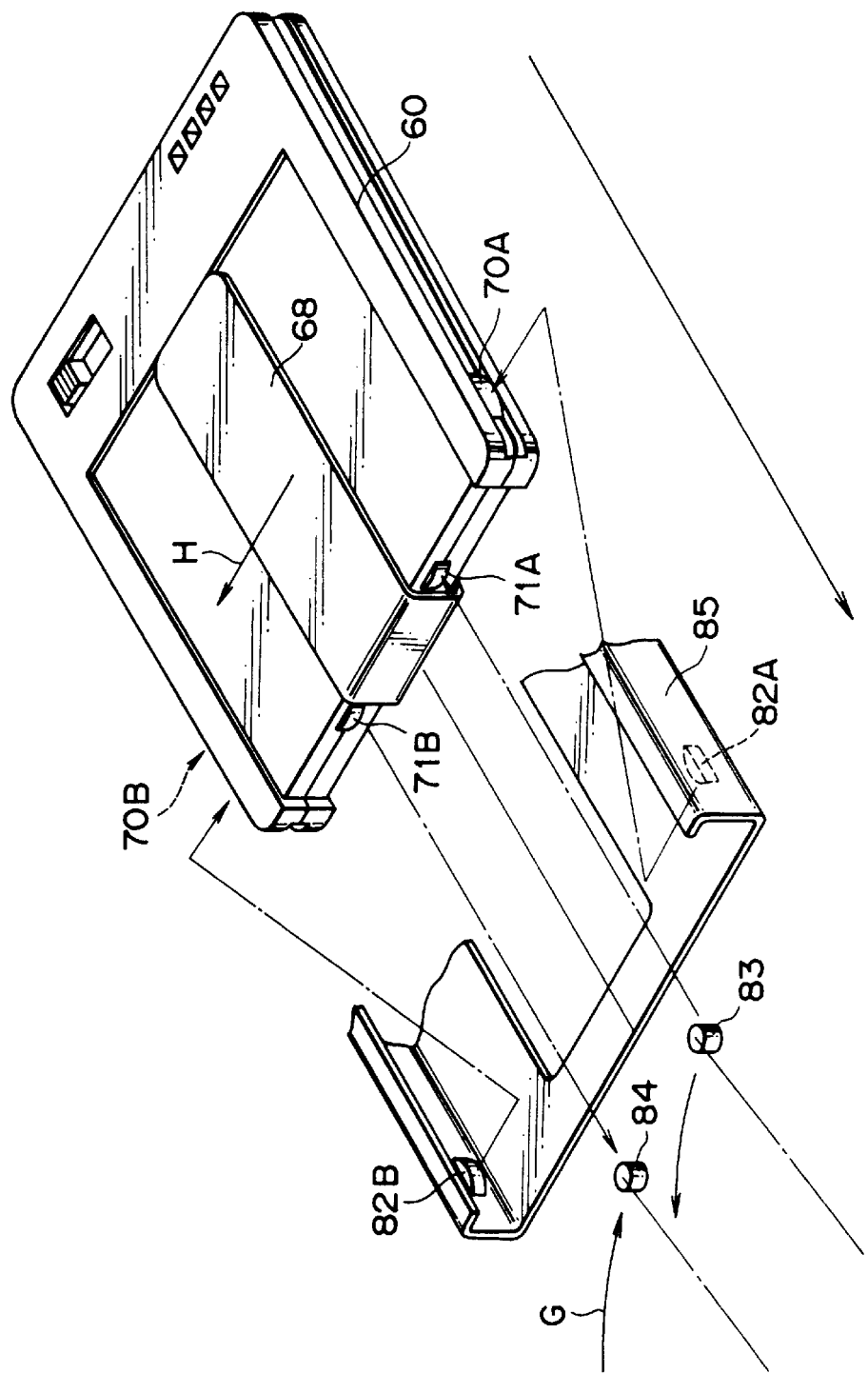
FIG. 23 is an exploded perspective view illustrating a loading mechanism employed in an optical disc drive of the present invention.

FIG. 23 is a perspective view illustrating the relationship between the movement restricting mechanism and the loading mechanism employed in the optical disc drive 10. In this optical disc drive 10, the disc cartridge 60 is inserted into a predetermined tray 85 in order to load the optical disc 12. The tray 85 is provided with protrusions 82A and 82B on the inner side of side surfaces of the tray 85. When the disc cartridge 60 is slid inwardly into the tray 85 to a predetermined position, the protrusions 82A and 82B press the buttons 70A and 70B respectively toward the inside of the disc cartridge 60.

The optical disc drive 10 is also provided with two rollers 83 and 84 at the inner part of the tray 85. The two rollers 83 and 84 are each installed at the end of an arm supported by a rotational shaft and pressed in a direction toward the side surfaces of the tray 85. As described above, when the disc cartridge 60 is slid inwardly into the tray 85, the buttons 70A and 70B are pressed by the protrusions 82A and 82B respectively toward the inside of the disc cartridge 60. With the buttons 70A and 70B pressed by the protrusions 82A and 82B toward the inside of the disc cartridge 60, the roller 83 comes into contact with the button 71A and one edge of the shutter 68. In addition, the roller 84 comes into contact with the button 71B and the other edge of the shutter 68.

As the disc cartridge 60 is further slid inwardly, the roller 83 presses the button 71A, causing the shutter 68 to slide aside. On the other hand, pressed away from the button 71B and the sliding shutter 68, the roller 84 rotates. As a result, the shutter 68 slides in a direction shown by an arrow H (FIG. 23), exposing the openings 63A and 64A. In the optical disc drive 10, as the shutter 68 is fully slid aside, the openings 63A and 64A are completely opened and the optical head 11 approaches the surface of the optical disc 12 in the disc cartridge 60 typically from a position below the optical disc 12. Thereafter, processing steps are performed such as a focus search operation.

When the disc cartridge 60 is unloaded from the optical disc drive 10, the roller 84, which was pressed away from the button 71B and the sliding shutter 68 and rotated in the loading operation, now presses back the shutter 68. As a result, the shutter 68 is restored to its original condition. In the case of a disc cartridge 60 having only roller 83, when the disc cartridge 60 is unloaded, the shutter 68 is retracted to its original condition by a spring installed inside the disc cartridge 60.

In the case of a disc cartridge 60 for accommodating and retaining a single-sided disc 12, the upper and lower cases 63 and 64 are designed so that the shutter 68 can be slid in only one direction only. As a result, it is possible to effectively prevent such a disc cartridge 60 from being mounted incorrectly.

Figure 24:
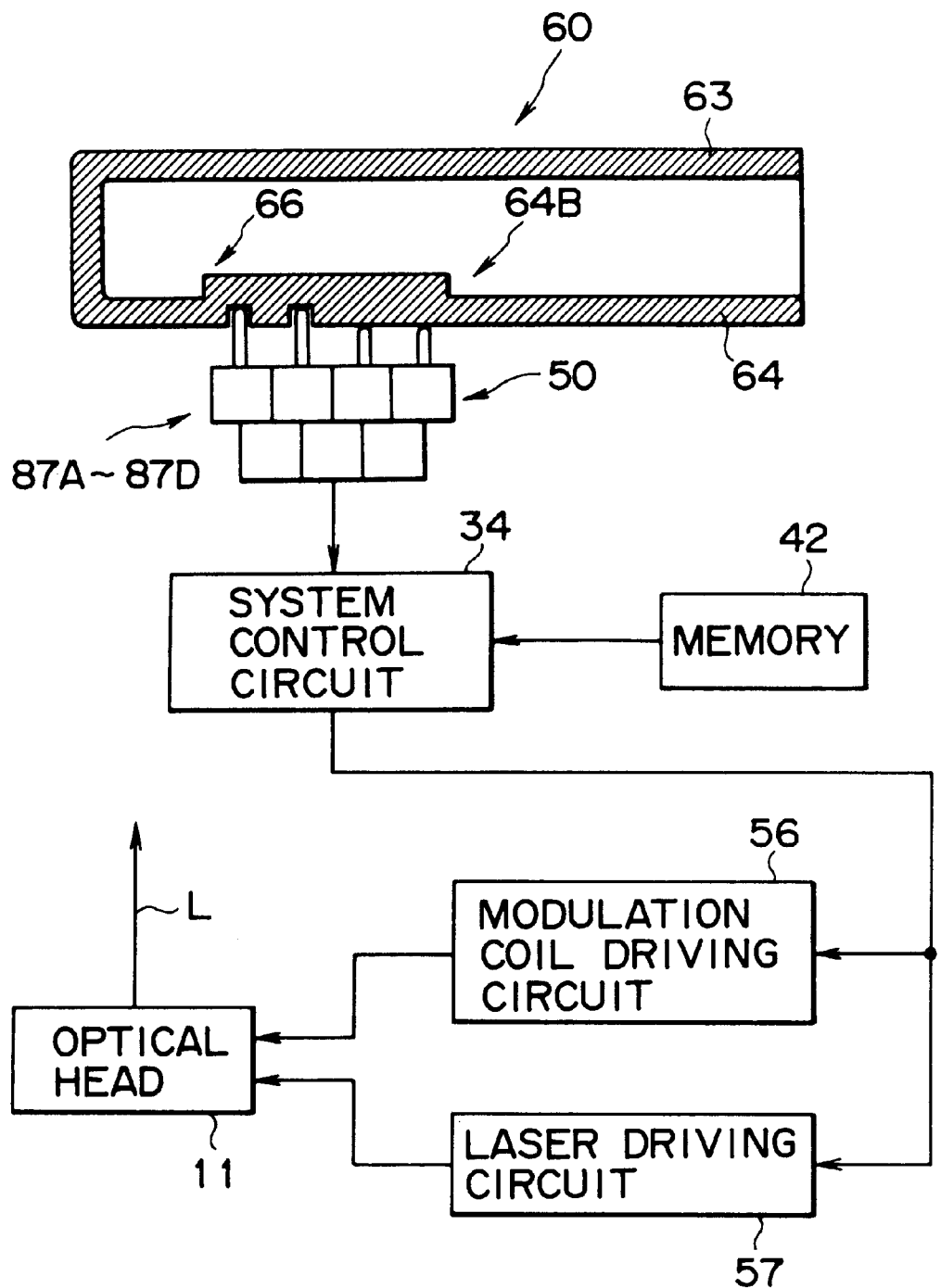
FIG. 24 is a block diagram for identifying the type of an information recording surface of an optical disc mounted on the optical disc drive shown in FIG. 23.
Figure 25:
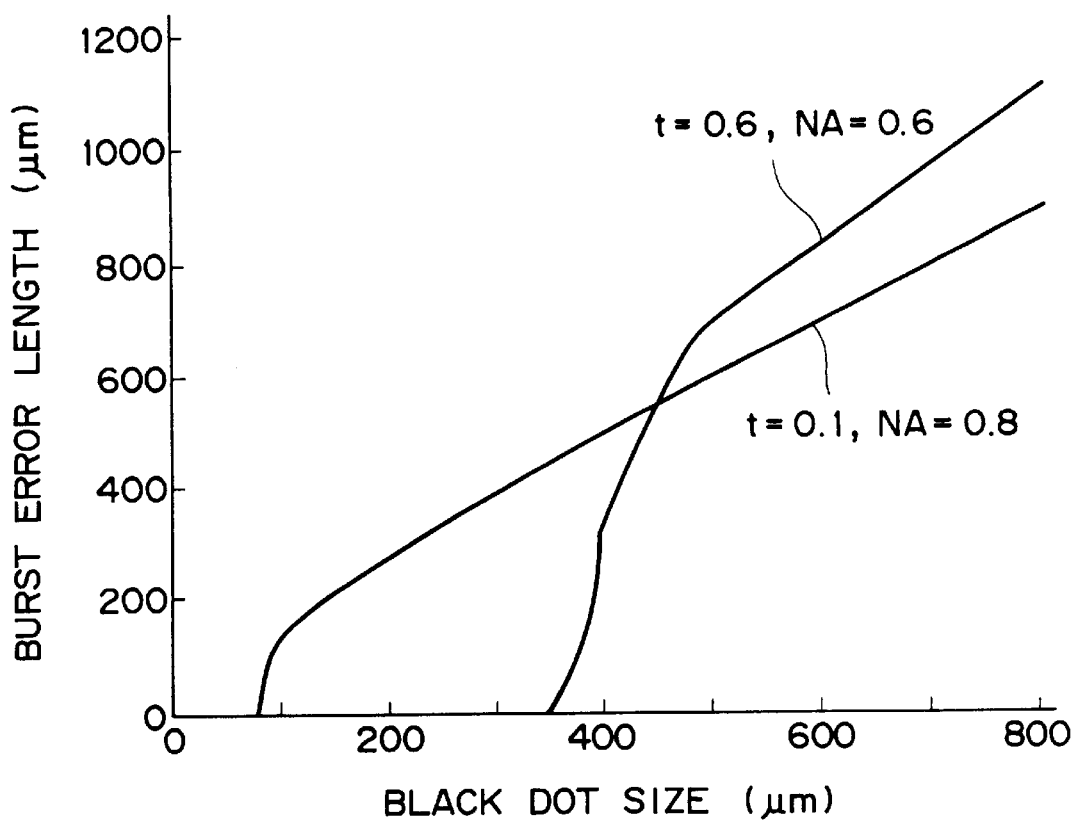
FIG. 25 is a diagram plotting the size of foreign material adhered to the disk and a burst error length caused thereby.

FIG. 24 is a block diagram illustrating the relationship between the identification area 63B or 64B and the optical disc drive 10. In the optical disc drive 10, a disc discriminator 50 is implemented by a plurality of switches 87A to 87D provided for the dent 66 formed in the identification area 64B.

More particularly, these switches 87A to 87D turn on and off depending upon whether the dent 66 is provided in the identification area 64B. A 4-value identification signal resulting from the on and off states of the switches 87A to 87D is supplied to the system control circuit 34.

When the disc cartridge 60 is inserted into the tray 85 as described above, the system control circuit 34 drives a predetermined driving mechanism to load the disc cartridge 60 and identifies the type of the information recording surface of the optical disc 12 accommodated in the disc cartridge 60 from the identification signal generated by the disc discriminator 50. The system control circuit 34 further reads out a reference laser light quantity for the type of the information recording surface of the optical disc 12 indicated as a result of the disc identification performed by the disc discriminator 50 from the memory unit 42 and sets a driving condition of a laser driving circuit 57 in accordance with the reference laser light quantity. In addition to reference laser light quantities for various types of optical disc 12, the memory unit 42 is also used for storing the frequency division ratio of the frequency divider 35B described earlier.

In a recording operation, the system control circuit 34 radiates a laser beam L to the surface of the optical disc 12 at a reference quantity of light appropriate for the type of the information recording surface of the optical disc 12 and sets a final light quantity of the laser beam L for the recording operation from a result of the radiation of the laser beam L at the reference quantity of light. In addition, in a case where the optical disc 12 is a photo-magnetic disc, the system control circuit 34 drives a modulation coil driving circuit 56, applying a modulating magnetic field to the radiation position of the laser beam L.

In the mastering apparatus 1 with a configuration as described with reference to FIG. 2, while the disc raw plate 2 is being rotated, the laser beam L is irradiated upon the surface of the optical disc 12, scanning the surface along a path having a spiral shape from the innermost circumference of the optical disc 12 to the outermost circumference thereof. As a result, grooves are provided at intervals of about 1.0 microns, each having a zigzag shape formed by the wobble signal WB.

At that time, the mastering apparatus 1 sets the shape of the spot and the light quantity of the laser beam L so that the width of each groove created by the exposure to the laser beam L is equal to the width of a gap between two adjacent grooves. As a result, the optical disc 12 made by the mastering apparatus 1 allows a land and groove recording operation to be performed with the groove taken as a reference. As a result, a land and groove recording operation can be performed on the optical disc 12 made by the mastering apparatus 1 at a line recording density of about 0.21 microns per bit, allowing data in an amount of 8 GB or more to be recorded. As a result, the mastering apparatus 1 is capable of making an optical disc 12 from the disc raw plate 2. With the optical disc 12, effective utilization of the information recording surfaces thereof allows data of the amount of 8 GB or more to be recorded.

While the disc raw plate 2 is being rotated at a constant rotational speed, the irradiation position of the laser beam is displaced by using the wobble signal WB, the frequency of which is sequentially increased step-by-step in order to carry out zoning. By using the rotational speed in each zone as a reference, the zigzag period of the groove is fixed for each inner and outer circumference.

At that time, the address signal generating circuit 6 employed in the mastering apparatus 1 generates an address data ID with the value thereof varying in accordance with the rotation of the disc raw plate 2 as shown in FIG. 3A. Synchronization data and other information are added to this address data ID to produce data to be assigned to the address area AR2 shown in FIGS. 3 and 4. The data is then modulated before being synthesized with the wobble signal WB in the synthesizing circuit 8. Finally, the synthesized signal is output to the driving circuit 5. As a result, the mastering apparatus 1 cuts the zigzag shape of each groove at predetermined angular intervals at which address data is recorded as an array of pits on the disc raw plate 2, creating a sector structure by dividing the disc raw plate 2 into radiation portions at the fixed angular intervals with address data recorded at the head of each of the radiation portions.

With the optical disc 12 made from the disc raw plate 2, even if dust particles and other foreign materials adhered to the surfaces of the optical disc 12 would make it impossible to play back address data correctly in an access to a sector by using the address data as a reference, interpolation processing based on the zigzag shape of the groove allows correct access to the sector. As a result, even if information is to be recorded as address data at a high recording density, a low degree of redundancy can be set for the information, allowing efficient utilization of the information recording surface commensurate with the reduction in degree of redundancy to be implemented. In this way, addresses recorded on the optical disc can be detected with a high degree of reliability.

When creating a sector structure as such, the mastering apparatus 1 varies the frequency of the wobble signal WB, performing zoning of concentric circular shapes on the disc raw plate 2. At the same time, pit arrays are formed to represent a sequentially increasing sector count as the zoning process moves from an inner circumference to an outer circumference. As a result, by applying the zone CLV technique to the zoning process, the information recording surface can be utilized with a high degree of efficiency in an access to the optical disc, allowing the access speed to be increased.

At that time, the address area AR2 is further divided into front and back areas which are used for recording address data of sectors in the following groove and address data of sectors in the following land. As a result, crosstalk from an adjacent track can be effectively eliminated, allowing address data to be reproduced with a high degree of reliability even in the case of data recorded at a high recording density in a land and groove recording operation.

In addition, at that time, two bits of the address data ID are allocated to an error detection code and, furthermore, the same address data ID is assigned to one area repeatedly, allowing the address data to be played back with an even higher degree of reliability.

As a result, in the process of manufacturing an optical disc 12 in accordance with the present embodiment, the mastering apparatus 1 makes the optical disc from the disc raw plate 2 by forming a sector structure on the disc raw plate 2 through predetermined processes.

On the information recording surface of the optical disc 12, a light transmissive layer with a thickness of about 0.1 mm is provided for permitting a laser beam to pass therethrough onto the information recording surface as shown in FIG. 5. As a result, even if the laser beam is generated from an optical system with a high numerical aperture, the laser beam passes through the light transmission layer, making it possible to effectively eliminate an effect of a skew (bend or warp), and hence, recording and playing back desired data into and from the information recording surface.

In the optical disc drive 10 shown in FIG. 6, the optical disc 12 experiences processing such as spindle control which uses as a reference the zigzag shape of the grooves. At that time, the PLL circuit 35 generates a highly accurate clock signal CK using the zigzag shape of the grooves as a reference and sector timing is detected by the cluster counter 38.

In particular, in the optical disc drive 10 shown in FIGS. 6 and 7, a laser beam with a wavelength of 650 nm is irradiated onto the optical disc 12 by way of an objective lens 17 having a numerical aperture of 0.78 and a working distance DW set at 560 microns. Light returning from the optical disc 12 is received by the optical head 11 for detecting a playback signal RF with the level thereof varying in accordance with (1) the light quantity of the returned light, (2) a playback signal MO with the level thereof varying in accordance with the plane of polarization of the returned light, (3) a push-pull signal PP with the level thereof varying in accordance with the displacement of the radiation position of the laser beam relative to a groove or an array of pits, and (4) a focus error signal FE with the level thereof varying in accordance with a defocus quantity.

The wobble signal detecting circuit 39 extracts the wobble signal WB from the push-pull signal PP. The wobble signal WB is then converted into a binary signal S1 which allows edge information to be extracted. The PLL circuit 35 provided after the wobble signal detecting circuit 39 establishes phase synchronization of the binary signal S1. This PLL circuit 35 conveys the edge information with the clock signal CK output by the frequency divider 35B employed in the PLL circuit 35 in order to generate the read/write clock signal R/W CK.

Since the wobble signal WB is generated at that time by using a carrier signal having a single frequency, the edge information extracted from the binary signal S1 includes correct phase information. As a result, by establishing phase synchronization with the edge information, a highly accurate read/write clock signal R/W CK can be generated.

The number of pulses in the read/write clock signal R/W CK is counted by the cluster counter 38 by using timing of frame synchronization detected from the address area AR2 by the address detecting circuit 37 as a reference in order to establish read/write timing in the recording/playback circuit 53 shown in FIG. 9. Since this timing is set by using the highly accurate read/write clock signal R/W CK as a reference, the optical disc drive 10 is capable of setting read/write timing and the like by recognition of the irradiation position of the laser beam with a high degree of accuracy. As a result, in an operation to record user data onto the optical disc 12 at a high recording density, the user data can be recorded by utilizing the information recording surface of the optical disc 12 at a high recording density.

At that time, even if it is difficult to correctly detect timing of frame synchronization at the address detecting circuit 37, by counting the number of pulses in the read/write clock signal R/W CK generated by the PLL circuit 35 by means of the cluster counter 38, correct timing can be detected. As a result, even in an operation to play back data from the optical disc 12 or to record desired data from an optical system having a high numerical aperture, the data can be played back or recorded with a high degree of reliability.

In this way, when processing the wobble signal WB, the PLL circuit 35 varies the frequency division ratio of the frequency divider 35B employed therein in accordance with the radiation position of the laser beam, allowing the spindle motor 33 to rotate the optical disc 12 by adopting the so-called ZCLV (Zone Constant Linear Velocity) technique.

At that time, the zigzag period of a groove is formed to have a fixed value in each area by using the rotational speed as a reference. As a result, by quickly establishing synchronization of the PLL circuit 35 in each zone, the access speed can be increased commensurately with the quick establishment of the synchronization. In addition, since the zigzag period of a groove is formed to have a fixed value in each area by using the rotational speed of the optical disc 12 as a reference, an undesirable effect of an adjacent track can also be effectively eliminated as well.

As a result of such control of recording/playback timing executed in a recording operation by the optical disc drive 10 shown in FIG. 9, the encoder 51 compresses a video signal and an audio signal in a format prescribed by the MPEG, converting the signals into user data DU. The user data DU is then modulated in predetermined ECC block units. In addition, in a case where the optical disc 12 is a photomagnetic disc, with the light quantity of the laser beam from the optical head 11 intermittently increased with timing synchronized to the read/write clock signal R/W CK, the modulation coil driving circuit 56 applies a modulating magnetic field to the radiation position of the laser beam in accordance with data of ECC blocks resulting from the modulation. This, in turn, allows the user data DU to be recorded in a thermal magnetic recording process.

In a case where the optical disc 12 is a variable phase optical disc or a postscript-type optical disc, the light quantity of the laser beam is varied by the laser driving circuit 57 in accordance with data of ECC blocks resulting from the modulation with timing synchronized to the read/write clock signal R/W CK, allowing the user data DU to be recorded.

At that time, the optical disc driver 10 assigns and records user data DU of 1 ECC block to and in four consecutive sectors. Since the timing of a recording start can be detected with a high degree of accuracy by means of a highly accurate clock signal and, in addition, since correct timing can also be detected by interpolation as a measure taken to handle dust particles and other foreign material adhered to the surfaces of the optical disc 12, the user data DU can be recorded in the sectors with a high degree of reliability even if the operation to record the user data DU on the optical disc 12 is performed by an optical system having a high numerical aperture at a high recording density.

Similar to the recording operation, in a playback operation, the optical disc drive 10 detects sectors from which data is to be reproduced. After the playback signals RF and MO obtained from the optical head 11 are converted into a binary signal, a playback clock signal is generated. By using the playback clock signal as a reference, pieces of playback data are sequentially obtained one piece after another and then demodulated into an output signal. At that time, the playback signal MO reproduced from a photomagnetic disc 12 has a small S/N ratio in comparison with the playback signal RF obtained from an array of pits. In the present embodiment, however, the address area AR2 for recording an array of pits is created into a radiation shape in each zone, allowing crosstalk that would otherwise interfere the playback signal MO coming from the array of pits to be eliminated effectively.

Thus, in an access to the optical disc 12 coated with a light transmissive layer having a thickness of 0.1 mm made by an optical system with a high numerical aperture employed in the optical disc apparatus 10, the levels of the playback signals RF and MO are changed even by relatively small amounts of dust particles and other foreign materials adhered to the surfaces of the optical disc 12. As a result, concerns are raised that the error rate is increased in comparison with the conventional apparatus.

In order to solve this problem, the optical disc 12 shown in FIG. 1 is accommodated in a disc cartridge 60 in such a way that it is difficult to remove the disc 12 from the cartridge 60. By mounting the disc cartridge 60 on the optical disc drive 10, dust particles and other foreign material can be prevented from being adhered to the surfaces of the optical disc 12.

In addition, in this case, the optical disc 12 is accommodated in the disc cartridge 60, being sandwiched by the sheet materials 61 and 62 facing the surfaces of the optical disc 12. The sheet materials 61 and 62 are used for wiping the dust particles and other foreign materials from the surfaces of the optical disc 12, effectively preventing the deterioration of the error rate caused by effects of the dust particles and other foreign materials.

Furthermore, in this case, the circumferential edges of the sheet materials 61 and 62 are attached to each other by using an adhesive agent to form an envelope for enclosing the optical disc 12, effectively preventing dust particles and other foreign materials intruding into the disc cartridge 60 from being adhered alto the surfaces of the optical disc 12.

In addition, since a cut with a minimum size required for chucking the optical disc 12 and required by the optical head 11 for making an access to the surfaces of the optical disc 12 is made on each of the sheet materials 61 and 62, by covering the optical disc 12 with the sheet materials 61 and 62, the amount of dust particles and other foreign materials adhered to the surfaces of the optical disc 12 can be minimized. Moreover, the pressing members 65B and 65 are used for pressing the sheet materials 61 and 62 respectively against the surfaces of the optical disc 12, further increasing the effect of removal of the dust particles and other foreign materials by means of the sheet materials 61 and 62.

With the optical disc 12 retained in the disc cartridge 60 the disc cartridge 60 slides the shutter 68 aside, exposing the openings 63A and 64A of the upper case 63 and the lower case 64 respectively. As a result, the optical disc 12 is exposed to the optical head 11 allowing the optical head 11 to access the surface of the optical disc 12. The disc cartridge 60 is also provided with a shock relieving or sealing member 63D surrounding the opening 63A and a shock relieving or sealing member 64D surrounding the opening 64A. The sealing member 63 closes a gap between the shutter 68 and the opening 63A. In the same manner, the shock relieving or sealing member 64 is used for closing the a gap between the shutter 68 and the opening 64A. In this way, dust particles and other foreign materials can be effectively prevented from intruding into the surfaces of the optical disc 12 (see FIG. 15 as well).

When the button 70A provided on one of the side surfaces of the disc cartridge 60 as shown in FIGS. 16 to 19 is pressed toward the inside of the disc cartridge 60 a restriction imposed by the first stopper 75A on the movement of the second stopper 79A is removed. Similarly, when the button 70B provided on the other side surface of the disc cartridge 60 as shown in FIGS. 20 to 22 is pressed toward the inside of the disc cartridge 60 a restriction imposed by the first stopper 75B on the movement of the second stopper 79B is removed. Even after the restrictions have been removed, however, the shutter 68 still cannot be slid aside unless the second stopper 79A or 79B is released from an engaged state with the shutter 68 by pressing the button 71A or 71B respectively which is provided on the front edge of the disc cartridge 60. As a result, the openings 63A and 64A cannot be exposed inadvertently by an incorrect operation performed by the user. Thus, it is possible to effectively avoid intrusion of dust particles and other foreign materials into the case of the disc cartridge 10 caused by such an incorrect operation.

As described above, as long as the buttons 70A and 70B and then 71A or 70A and 70B and then 71B are not sequentially operated in the order the buttons are enumerated, the shutter 68 will never be slid aside. As a result, the openings 63A and 64A are exposed only if required in a reliable manner, preventing and/or reducing the amount of dust particles and other foreign materials adhered to the surfaces of the optical disc 12 with a high degree of reliability.

When the disc cartridge 60 in which the optical disc 12 is accommodated as described above is placed on a tray 85 of the optical disc drive 10 as shown in FIG. 23, a driving mechanism is driven by the system control circuit 34 to slide the disc cartridge 60 to the inner part of the tray 85. As a result, the buttons 70A and 70B provided on the side surfaces of the disc cartridge 60 are pressed by the protrusions 82A and 82B provided on the side surfaces of the tray 85 toward the inside of the disc cartridge 60. Thereafter, the button 71A provided on the front edge of the disc cartridge 60 are pressed toward the inside of the disc cartridge 60 by the roller 83 which then pushes the shutter 68 aside. As a result, the shutter 68 is slid, exposing the openings 63A and 64A. The optical heads 11 then approach the surfaces of the optical disc 12 through these openings 63A and 64A, completing the operation to load the optical disc 12.

With the optical disc drive 10 in this state, the disc discriminator 50 detects whether a dent 66 exists in the identification area 63B or 64B provided on the upper case 63 or lower case 64 respectively of the disc cartridge 60 for identifying the type of the information recording surface of the optical disc 12 to be accessed by the optical head 11 as shown in FIG. 24. That is, the type of the information recording surface can be identified from the dent 66. In addition, as a result of the setting of the slide switches 67 provided on the disc cartridge 60 the circuits shown in FIG. 24 determine whether an operation to write information into the information recording surfaces is inhibited.

In a case where the optical disc 12 is a photo-magnetic disc, the operations of the modulation coil driving circuit 56 and the laser driving circuit 57 employed in the optical disc drive 10 are started, recording user data DU into the optical disc 12 by adopting the thermal magnetic recording technique. In a case where the optical disc 12 is a variable phase optical disc or a postscript-type optical disc, on the other hand, the operation of the laser driving circuit 57 is started, recording user data DU into the optical disc 12 by utilization of an array of pits.

At that time, the optical disc drive 10 irradiates a laser beam L to the surface of the optical disc 12 at a reference laser light quantity which is read out from the memory unit 42 selectively depending upon the type of the optical disc 12. An optimum quantity of light is then determined on the basis of a result of the irradiation of the laser beam L at the reference quantity of light. As a result, the optical disc drive 10 is capable of recording desired data on the optical disc 12 having a variety of types.

At that time, the modulation coil 18 employed in the optical head 11 on the side of the objective lens 17 as shown in FIG. 8 applies a modulating magnetic field to the optical disc 12 coated with the light transmissive layer with a thickness of 0.1 mm. As a result, even if access to the surface of the optical disc 12 is made by using an optical system with a high numerical aperture, various kinds of data can be recorded not only onto a variable phase optical disc and a postscript-type optical disc, but also onto a photo-magnetic disc, substantially widening the application range of the optical disc drive 10.

According to the configuration described above, an optical disc is accommodated and retained in a disc cartridge in such a way that it is difficult to remove the disc from the cartridge. A shutter which is normally closed is opened to allow access to the surfaces of the optical disc. By closing gaps between the shutter and the case of the disc cartridge using shock relieving or sealing members, the amount of dust particles and other foreign materials intruding into the surfaces of the optical disc can be reduced. Therefore, deteriorations of the recording and playback characteristics due to an effect of dust particles and other foreign materials adhered to the surfaces of the optical disc are reduced effectively commensurately with the reduction of the amount of dust particles and other foreign materials intruding into the surfaces of the optical disc.

In addition, by providing movement restricting mechanisms for restricting the movement of the shutter, the shutter can be prevented from being closed and opened inadvertently by an incorrect operation performed by the user, allowing the amount of dust particles and other foreign materials intruding into the surfaces of the optical disc to be reduced. The movement restricting mechanisms provide a threefold safety function for restricting operations to open or close the shutter, reliably preventing the shutter from being opened and closed by an incorrect operation performed by the user.

Sheet materials are further provided for cleaning the surfaces of the optical disc. Moreover, by joining the circumferential edges of the sheet materials by using an adhesive agent into an envelope for enclosing the optical disc, the recording and playback characteristics of the optical disc can be prevented in an even more effective manner from deteriorating due to dust particles and other foreign materials adhered to the surfaces of the optical disc. In addition, elastic members are used for pressing the sheet materials against the surfaces of the optical disc, allowing the cleaning effect of the sheet materials on the surfaces of the optical disc to be increased. As a result, it is possible to effectively prevent the recording and playback characteristics of the optical disc from deteriorating.

Furthermore, the sheet materials each have a cut with a minimum size which is required for making an access to the surface of the optical disc 12 while the optical disc 12 is being rotated and the surfaces of the optical disc 12 are covered by the sheet materials as much as possible except an area on each surface corresponding to the cut. As a result, the sheet materials are certainly capable of keeping the surfaces of the optical disc 12 clean.

In the case of the embodiment described so far, the shock relieving or sealing member closing the gaps between the shutter and the case of the disc cartridge are each made of felt while the sheet materials for cleaning the surfaces of the optical disc are each made of cloth. It should be noted, however, that the description is not intended to be construed in a limiting sense. That is, the scope of the present invention is not limited to the embodiment herein described. Accordingly, a wide variety of materials can be used for making the shock relieving and sealing members and the sheet-like members. For example, the shock relieving or sealing members can each be made of cloth while the sheet materials can each be made of felt.

In addition, in the case of the embodiment herein described, the movement restricting mechanisms for restricting the movement of the shutter have a configuration wherein the shutter is opened after pressing the buttons provided on both the side surfaces of the disc cartridge and a button provided on a front edge of the disc cartridge sandwiched by the two side surfaces. It should be noted, however, that the description is not intended to be construed in a limiting sense. That is, the scope of the present invention is not limited to the embodiment herein described. A wide variety of configurations depending on the application can be adopted for the movement restricting mechanisms whenever required.

Furthermore, in the case of the embodiment herein described, the circumferential edges of the sheet materials are joined to each other by using an adhesive agent to form an envelope for enclosing the optical disc. It should be noted, however, that the description is not intended to be construed in a limiting sense. That is, the scope of the present invention is not limited to the embodiment described so far. Due to, among other reasons, the fact that the level of the effect of dust particles and other foreign materials adhered to the surfaces of the optical disc varies depending upon the ability of the optical disc drive to correct errors, for example, only portions of the circumferential edges can be attached to each other to form an envelop with a partially sealed edge which is sufficient for practical uses. In addition, instead of attaching the circumferential edges of the sheet materials to each other, for example, sheet materials partially overlap one another and are folded to form an envelope.

In addition, in the case of the embodiment herein described, gaps between the shutter and the case of the disc cartridge are closed the shock relieving or sealing members and the optical disc is enclosed in an envelope formed by attaching the circumferential edges of the sheet materials to each other. It should be noted, however, that the description is not intended to be construed in a limiting sense. That is, the scope of the present invention is not limited to the embodiment described so far. If the shock relieving or sealing members can reduce the effect of dust particles and other foreign materials adhered to the surfaces of the optical disc to an amount small enough for practical purposes, it is possible to adopt a configuration wherein sheet materials are merely provided over the surfaces of the optical disc without being formed into an envelope or a sheet material is used to cover only one of the surfaces of the optical disc. In addition, the elastic members for pressing the sheet materials against the surfaces of the optical disc can be eliminated. Furthermore, the sheet materials can be provided only partially or can be even eliminated completely.

As opposed to the above alternatives for the sheet materials or lack of necessity thereof, the shock relieving or sealing members used for closing the gaps between the shutter and the case of the disc cartridge can be eliminated wherein the use of the sheet materials can effectively reduces the effect of dust particles and other foreign materials adhered to the surfaces of the optical disc.

Furthermore, in the embodiment herein described, a pressing member is provided on the lower case for pressing the lower sheet material against the lower surface of the optical disc. In the case of a double-sided optical disc with information recording surfaces provided on both the sides thereof, the pressing member is provided on each of the lower and upper cases. It should be noted, however, that the description is not intended to be construed in a limiting sense. That is, the scope of the present invention is not limited to the embodiment herein described. In place of such a pressing member, the pressing effect of the pressing member can be produced by partially folding the sheet material, by creating a protrusion more elastic than the case of the disc cartridge or by providing an elastic member based on other configuration components forming the disc cartridge.

In addition, in the case of the embodiment herein described, data of up to 8K bytes is recorded in one address area AR2 by using an array of pits. It should be noted, however, that the description is not intended to be construed in a limiting sense. That is, the scope of the present invention is not limited to the embodiment described so far. The present invention can also be applied to a wide range of applications including a case in which data having a variety of byte counts is recorded and a case where an address is recorded in the form of the zigzag shape of the groove in place of the array of pits.

Furthermore, in the case of the embodiment herein described, the zigzag shape of an entire groove is made using a wobble signal. It should be noted, however, that the description is not intended to be construed in a limiting sense. That is, the scope of the present invention is not limited to the embodiment described so far. The present invention can also be applied to a wide range of applications including a case in which only the edge on one side of a groove is zigzag or the edges on both sides of a groove are made zigzag by using two different wobble signals.

In addition, in the case of the embodiment herein described, each groove has a track pitch of 0.5 microns for land and groove recording. It should be noted, however, that the description is not intended to be construed in a limiting sense. That is, the scope of the present invention is not limited to the embodiment described so far. The present invention can also be applied to a wide range of applications including a case in which each groove is created at a small track pitch. By setting a line recording density at an appropriate value or providing redundancy to data in a recording operation, for example, the track pitch can be set 0.64 microns or smaller and a recording capacity of 8 GB can yet be attained.

Furthermore, in the case of the embodiment herein described, a light transmissive layer with a thickness of 0.1 mm is provided on the information recording surface. It should be noted, however, that the description is not intended to be construed in a limiting sense. That is, the scope of the present invention is not limited to the embodiment described so far. For example, the thickness of the light transmissive layer can be set at 177 microns or smaller and a recording capacity of 8 GB can still be attained. However, a thickness of at least 3 microns for the light transmissive layer is necessary.

In addition, in the case of the embodiment herein described, user data is recorded at a line recording density of 0.21 microns per bit. It should be noted, however, that the description is not intended to be construed in a limiting sense. That is, the scope of the present invention is not limited to the embodiment described so far. For example, the present invention can be applied to a case in which user data is recorded at a line recording density of 0.23 microns per bit and about the same recording capacity as the embodiment described above can yet be secured. If this line recording density is translated into a bit length and a mark length, the smallest bit length and a mark length of 0.3 microns are the allowable range.

Furthermore, in the case of the embodiment herein described, data is recorded and played back into and from an optical disc by allowing an optical system with a numerical aperture of 0.78 radiate a laser beam with a wavelength of 650 nm to the surface of the optical disc. It should be noted, however, that the description is not intended to be construed in a limiting sense. That is, the scope of the present invention is not limited to the embodiment described so far. For example, the present invention can be applied to a wide range of applications including a case in which desired data is recorded at a high recording density by using an optical system with a high numerical aperture. Moreover, if factors such as the thickness of the light transmissive layer and implementable working distance are considered, a recording capacity all but equal to that of the embodiment described herein can be attained where the numerical aperture is set at 0.78 or higher and the working distance is set at 560 microns or smaller.

In addition, in the case of the embodiment described so far, the present invention is applied to an optical disc which data can be recorded onto. It should be noted, however, that the description is not intended to be construed in a limiting sense. That is, the scope of the present invention is not limited to the embodiment described so far. The present invention can also be applied to an optical disc used specially for playback purposes only.

According to the configuration described above, in a disc cartridge used for accommodating and retaining an optical disc, gaps between a shutter and the case of the disc cartridge are closed by shock relieving or sealing members and sheet-like members are used for cleaning the surfaces of the optical disc. As a result, the amount of dust particles and other foreign materials adhered to the surfaces of the optical disc can be reduced, effectively preventing the recording and playback characteristics of the optical disc from deteriorating.

While the present invention has been particularly shown and described with reference to certain preferred embodiments, it will be readily apparent to those of ordinary skill in the art that various changes and modifications may be made therein without departing from the spirit and scope of the invention. It is intended that the appended claims be interpreted as including the foregoing as well as various other such changes and modifications.

What is claimed is:

1. A disc cartridge for accommodating and retaining an optical disc having data recorded onto and reproduced therefrom by irradiation of a laser beam wherein said optical disc can be rotated in said disc cartridge but cannot be easily removed from said disc cartridge, said disc cartridge comprising:
    an opening extending in a radial direction of said optical disc to a periphery thereof;
    a shutter for closing and exposing said opening when the shutter is respectively moved between first and second positions; and
    a sealing member located at partly around the periphery of said opening without engaging said shutter and closing a gap between said shutter and the periphery of said opening for preventing and/or reducing foreign material from entering said opening and being adhered to said optical disc, and
    wherein said laser beam can be irradiated upon said optical disc through said exposed opening by sliding said shutter to its said second position.

2. The disc cartridge of claim 1 wherein said sealing member is an elastic member positioned on a surface of a housing of said disc cartridge surrounding said opening.

3. The disc cartridge of claim 1 wherein said sealing member is made of felt positioned on a surface of a housing of said disc cartridge surrounding said opening.

* * * * *